United States Patent
Sato et al.

(10) Patent No.: US 7,167,898 B2
(45) Date of Patent: Jan. 23, 2007

(54) COLLABORATION METHOD, SYSTEM, PROGRAM AND RECORD MEDIUM

(75) Inventors: Yuichi Sato, Kawasaki (JP); Shinichi Sazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 739 days.

(21) Appl. No.: 10/086,695

(22) Filed: Mar. 4, 2002

(65) Prior Publication Data

US 2003/0055893 A1   Mar. 20, 2003

(30) Foreign Application Priority Data

Sep. 14, 2001   (JP) .............................. 2001-279049

(51) Int. Cl.
   *G06F 15/16* (2006.01)
(52) U.S. Cl. ...................... 709/204; 709/206; 709/207
(58) Field of Classification Search ................ 709/204, 709/206, 207, 238; 715/753
   See application file for complete search history.

(56) References Cited

U.S. PATENT DOCUMENTS

| | | | | |
|---|---|---|---|---|
| 5,781,731 A | * | 7/1998 | Koreeda et al. | ............ 709/204 |
| 6,144,992 A | * | 11/2000 | Turpin et al. | ............... 709/208 |
| 6,161,149 A | * | 12/2000 | Achacoso et al. | ............. 710/4 |
| 6,366,948 B1 | * | 4/2002 | Teibel | .......................... 709/204 |
| 6,446,113 B1 | * | 9/2002 | Ozzie et al. | ................. 709/204 |
| 6,519,629 B2 | * | 2/2003 | Harvey et al. | ............... 709/204 |
| 6,640,241 B1 | * | 10/2003 | Ozzie et al. | ................. 709/204 |
| 6,687,738 B1 | * | 2/2004 | Hutton et al. | ................ 709/204 |
| 6,772,229 B1 | * | 8/2004 | Achacoso et al. | ............. 710/4 |
| 6,859,821 B1 | * | 2/2005 | Ozzie et al. | ................. 709/205 |
| 6,906,703 B2 | * | 6/2005 | Vablais et al. | .............. 345/179 |
| 2002/0188657 A1 | * | 12/2002 | Traversat et al. | ........... 709/201 |
| 2003/0002521 A1 | * | 1/2003 | Traversat et al. | ........... 370/465 |

* cited by examiner

*Primary Examiner*—Saleh Najjar
*Assistant Examiner*—V. Korobov
(74) *Attorney, Agent, or Firm*—Staas & Halsey LLP

(57) ABSTRACT

An electronic mail having thereon an URL of a conference host peer machine for automatically taking part in a conference by clicking once is sent to a plurality of conferee peer machines. A conferee peer machine at a shortest time location is searched through communication tests from the conference host peer machine to distribute data. After the distribution of data, remaining conferee peer machines are informed that the data distributed conferee peer machine is a mirror of the remaining conferee peer machines, and a conferee peer machine at a shortest time location is searched through communication tests from the conference host peer machine and from the mirror to distribute data. The above processes are repeated until data distribution completes.

16 Claims, 23 Drawing Sheets

FIG. 6

CONNECT BY MAIL

- 86
- 88 — TITLE: INVITATION TO SHARE DirectShare
- 90 — DESTINATION: Yamada@stars.flab.fujitsu.co
- 92 — BROADCASTING: [ ]
- ☐ SEND COPY TO ME, TOO.

94 — WE'LL REVIEW ×× WITH DirectShare

DETAILS OF CONFERENCE

- 96 — STARTING TIME: CONFERENCE WILL START FROM [18 ▼] : [00 ▼] ON [AUG. 20, 2001 ▼]
- 98 — NAME OF CONFERENCE: [CONFERENCE OF AUG. 20, 2001]   HOST: [sazawa]

```
*******************************
* THOSE WHO WANT TO PARTICIPATE, SEE BELOW FOR URL
* http://10.25.184.32:9912
*******************************
```

100 URL FOR PARTICIPATING IN CONFERENCE

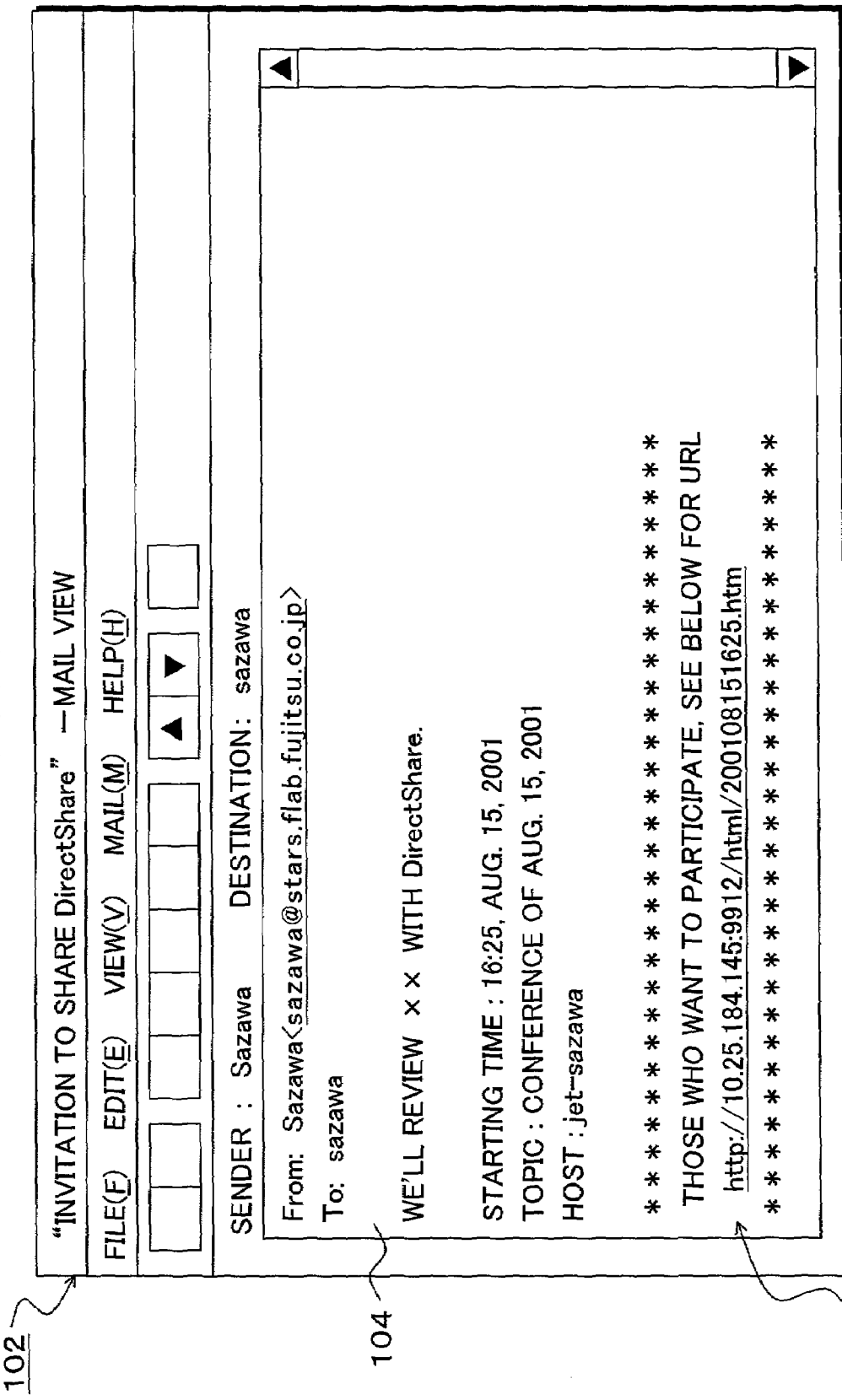

\*\*\*\*\*\*\*\*\*\*\*\*\*\*\*\*\*\*\*\*\*\*\*\*\*\*\*\*
THOSE WHO WANT TO PARTICIPATE, SEE BELOW FOR URL
  http://10.25.184.145:9912/html/200108151625.htm
\*\*\*\*\*\*\*\*\*\*\*\*\*\*\*\*\*\*\*\*\*\*\*\*\*\*\*\*

```
<metahttp-equiv="Refresh"
content="1;URL=FjDirectShare:10.25.184.145
```

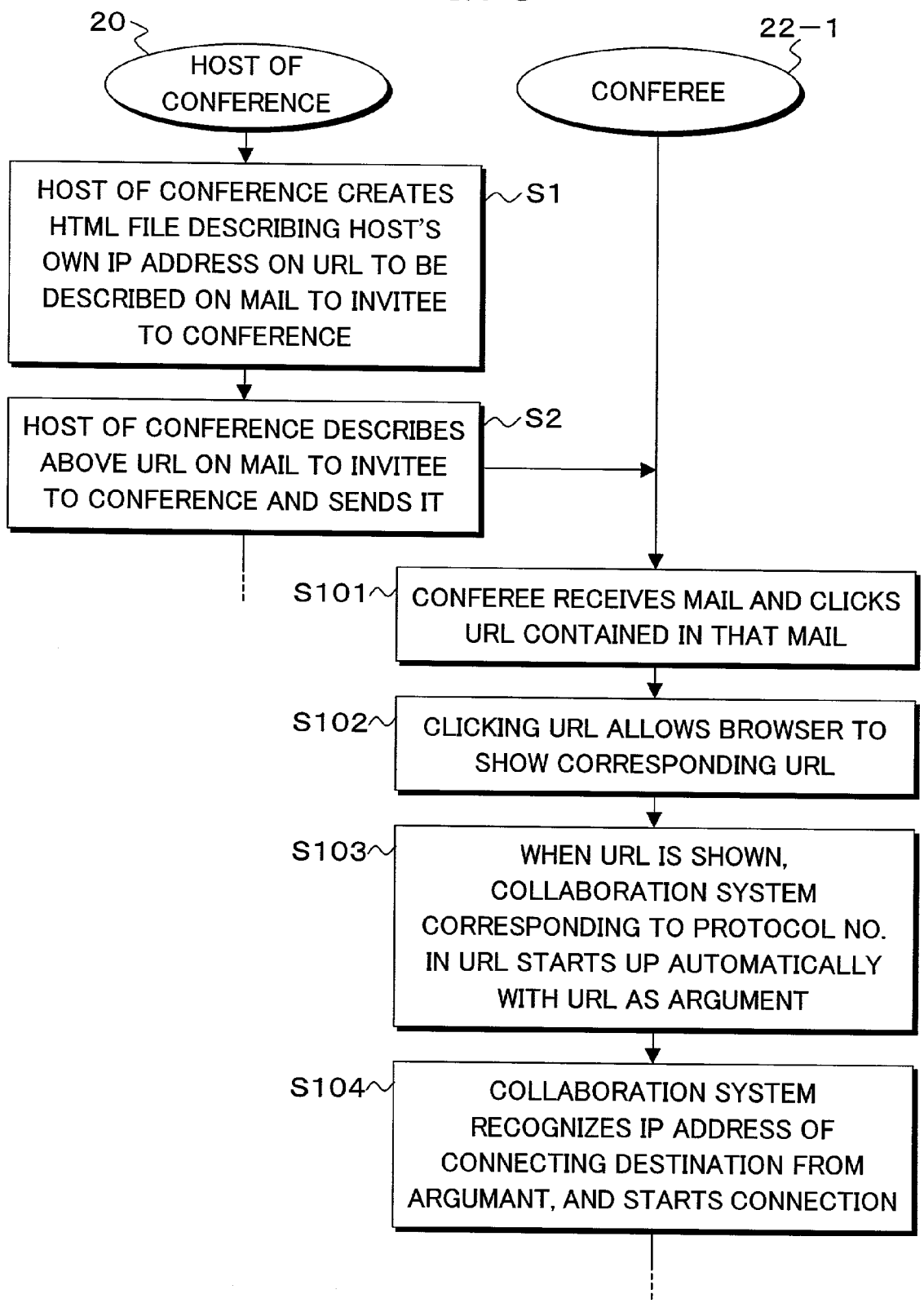

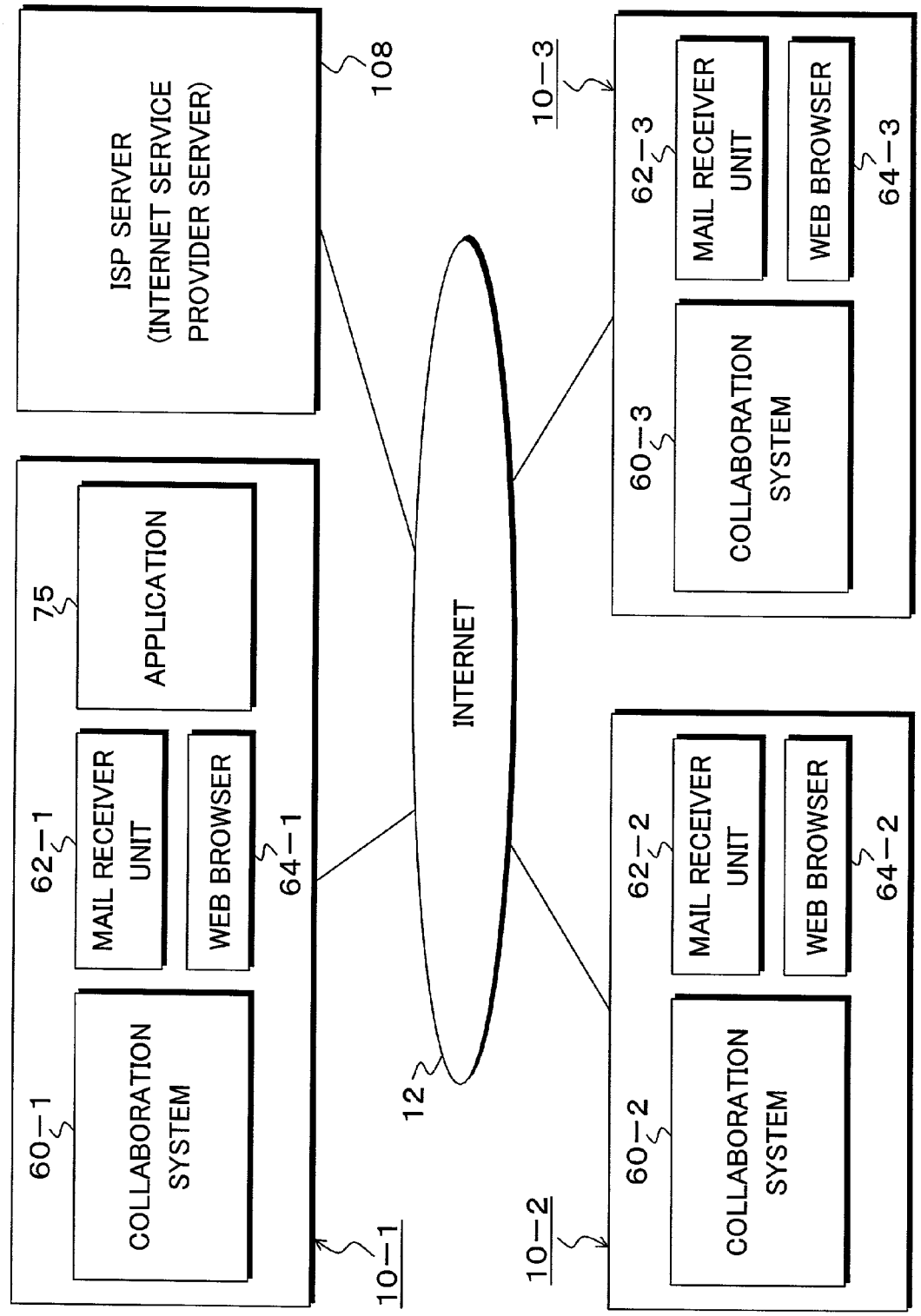

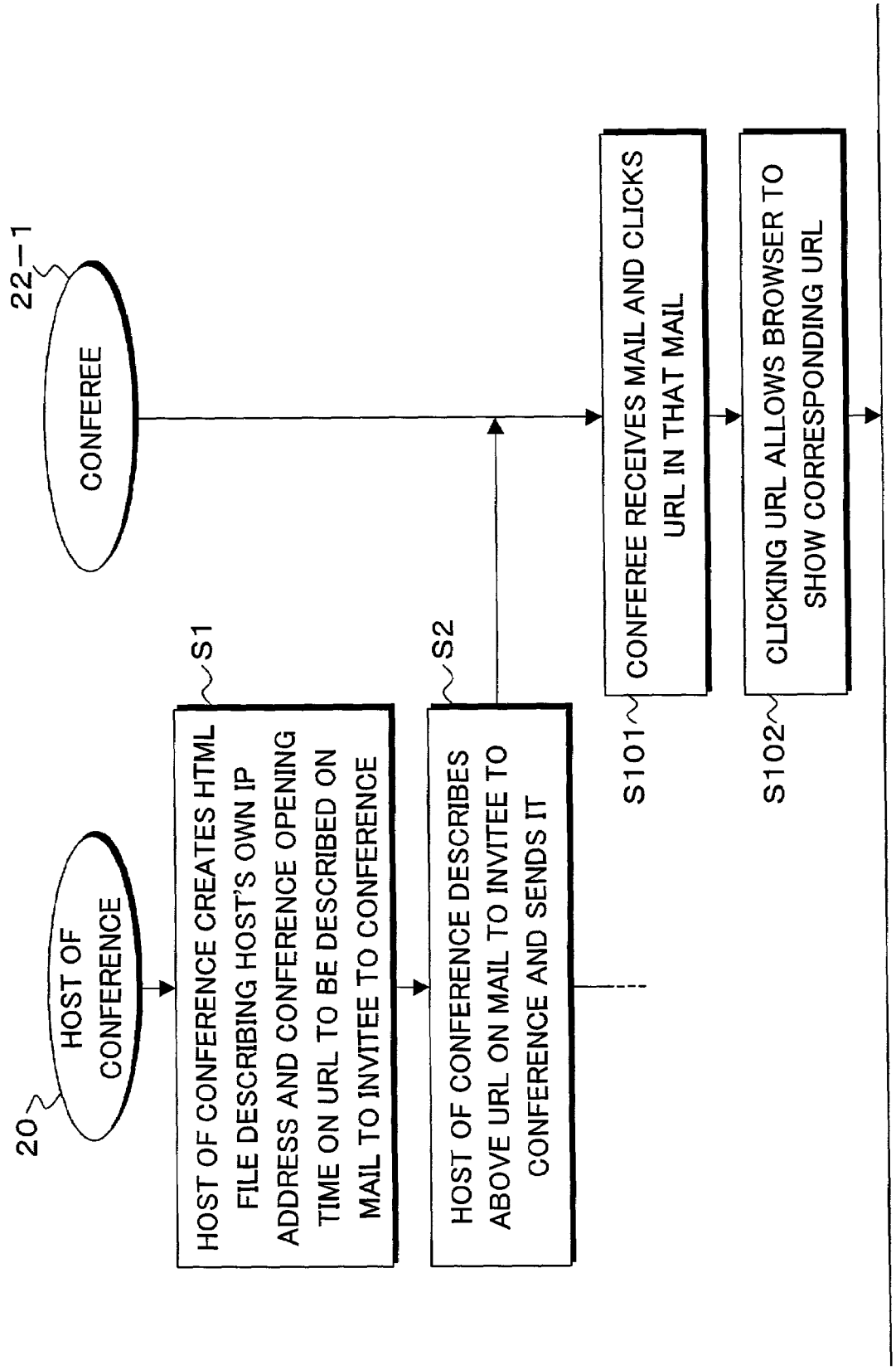

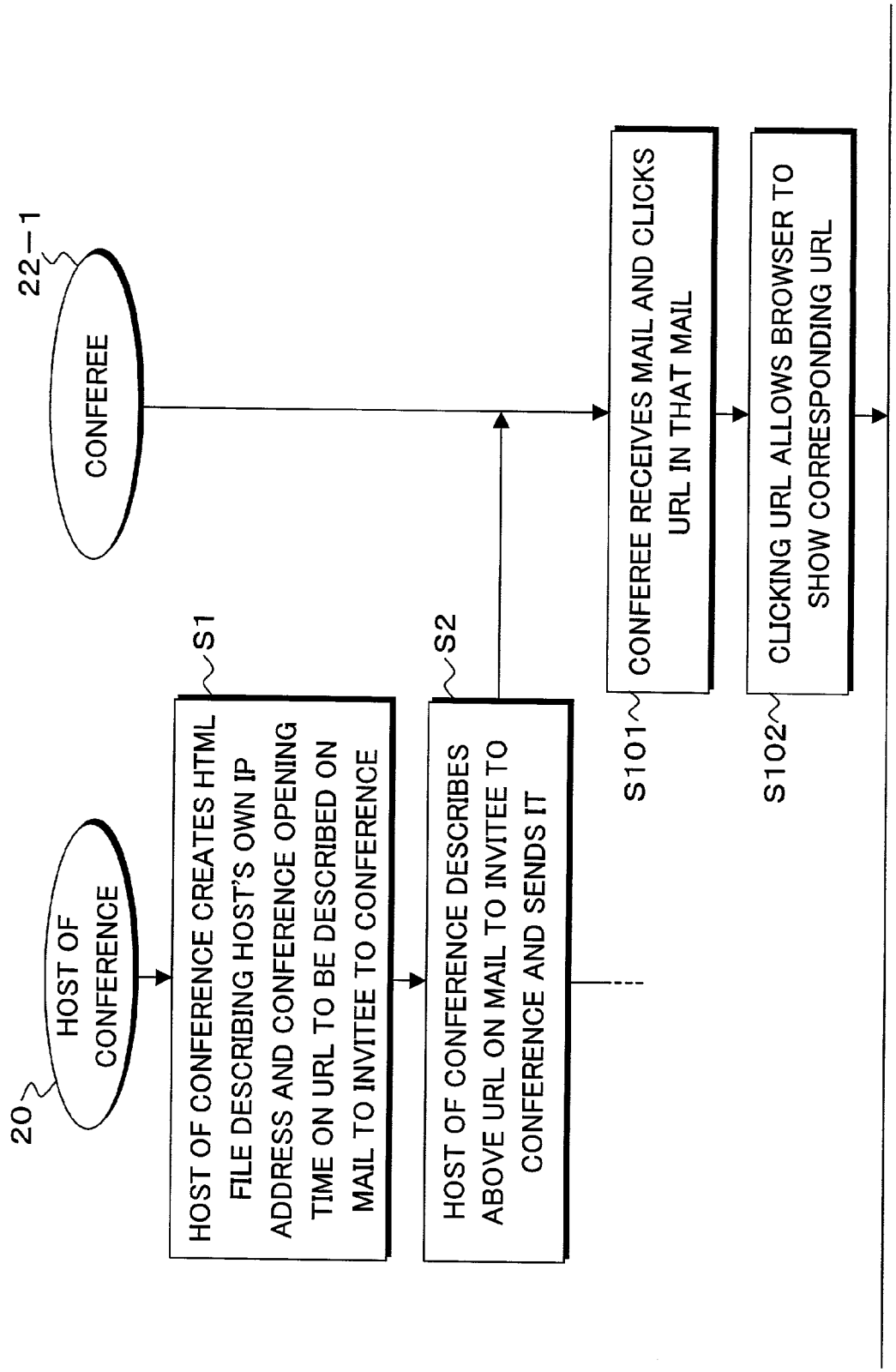

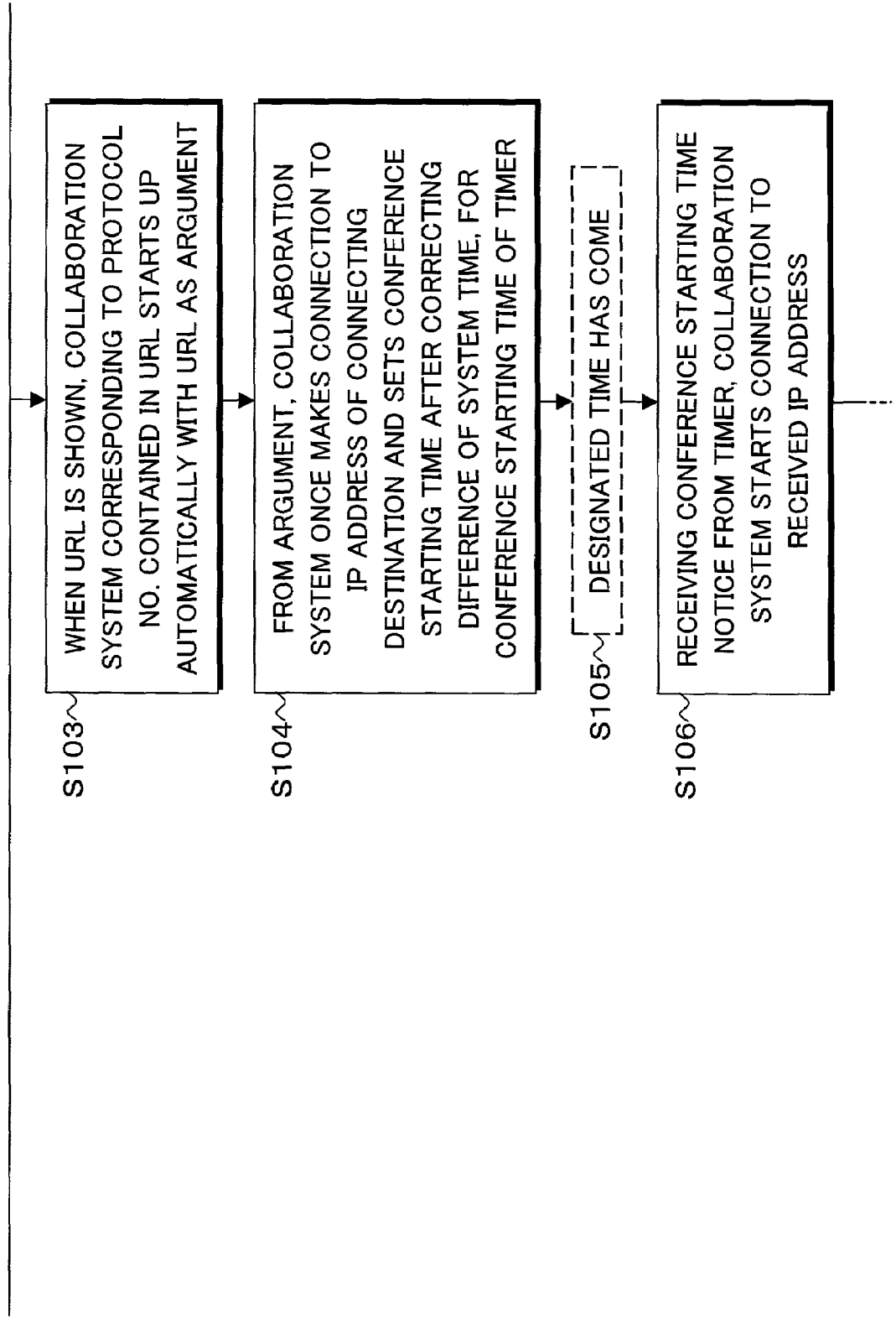

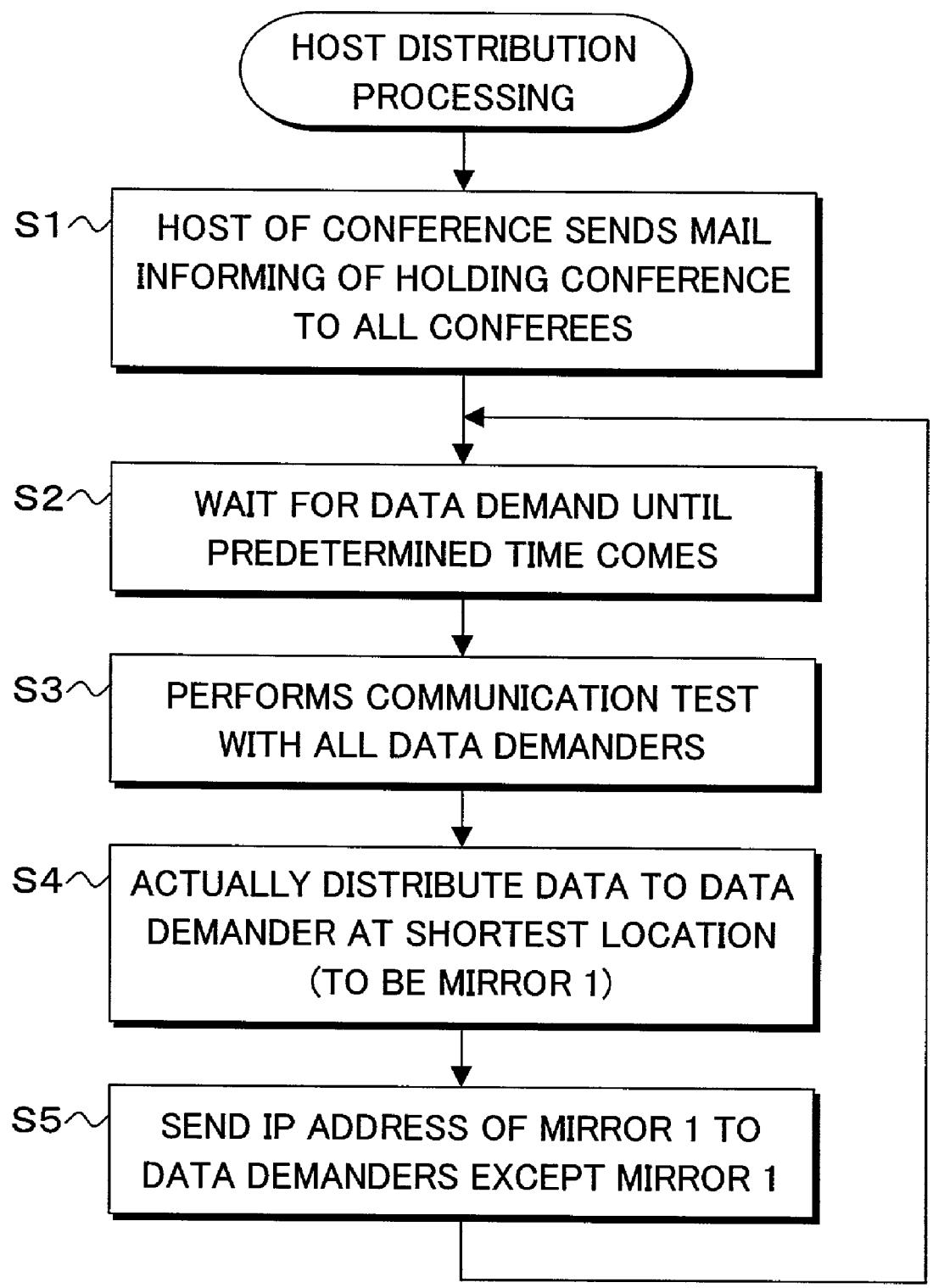

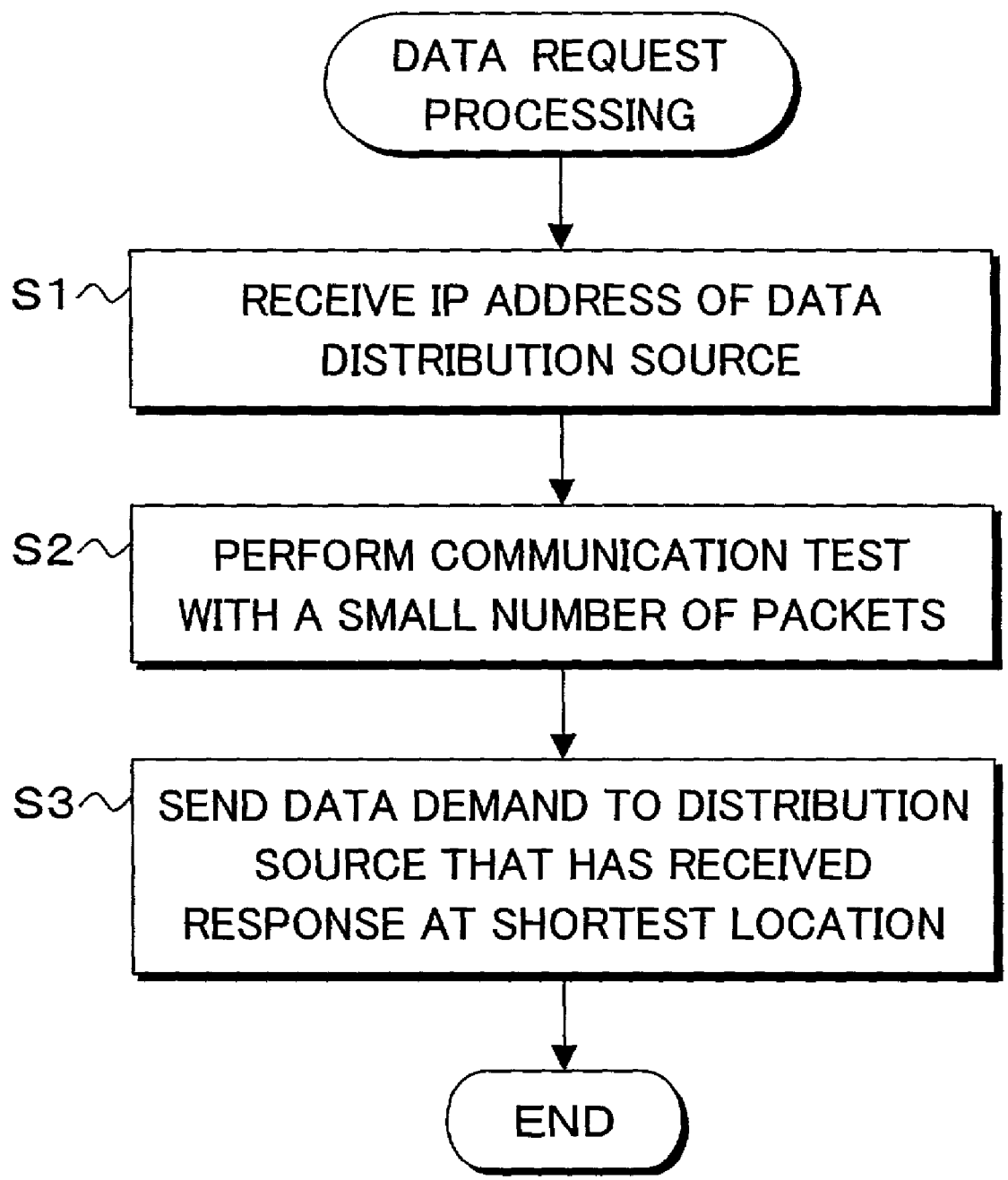

COLLABORATION METHOD, SYSTEM, PROGRAM AND RECORD MEDIUM

BACKGROUND OF THE INVENTION

1. Field of the Invention

The present invention relates to a collaboration method, system, program and record medium, in which computers are peer-to-peer connected via a network, and more particularly to a collaboration method, system, program and record medium, in which collaboration is started and maintained on a network using electronic mails.

2. Description of the Related Arts

With the Internet becoming widespread, a collaboration system to collaborate on a review work at a conference, etc., sharing some object between local area-to-area is being widely used. Also, due to enhanced machine performance or network infrastructure, large capacity of data can be now exchanged on a network, that could not be handled in the past. Moreover in the future, by the IPV6 (Internet Protocol Version 6), a possibility is expected to add an IP address to even a personal computer or mobile terminal, etc. of general users.

As shown in FIG. 1, the core of conventional collaboration has been of a server/client type installing clients 202-1 through 202-3 against a server 200. On a server/client type system, a certain server 200 performs centralized control of a network. The server 200 usually holds creation, management and deletion functions of data subject to collaboration. To take part in a certain group of collaboration, only required task for the server/client type-based collaboration system is to connect a client to the well-known server. Since the server manages all users, when connection to the server completes, a newly connected user is recognized as a member of the user group under the management of the server. Because of this, a conferee has been only required to manage a relatively small number of servers by itself.

However, in the server/client type-based collaboration system, a general user himself cannot freely create a group of users to start up collaboration within that group. However, as described firstly, since possibilities are now expected that hardware condition would be advanced and an IP address would be widely added, recent years, a peer-to-peer type collaboration system as shown in FIG. 1B has been gathering attention, as another communication model lined with the server/client type. The peer-to-peer type means that each user taking part in a network as peer machines 300-1 through 300-4 is equal to another (peer), without having a specific server, and all users have capabilities to start collaboration. However, on the peer-to-peer type, as users taking part in a network would be many and unspecified persons, it is actually impossible for each user to manage the IP address of the user's connecting partner. Due to this difficulty, in order to make own IP address known to many users, after all such a method would be required to present the user's own IP address to a server which is well-known to many users, so that other users can easily know the user's own address. However, the purpose of this method is for make the IP address known to others, and nothing more, and any client intends to make communication through that server. Recognizing the IP address of the partner, the user directly connects to that IP address to begin communication. Also, as a difficult point for the peer-to-peer type to connect a network under the current network environment can be that the user of general household does not have a fixed global IP address. Generally, if the user does not have an IP address, such a method is employed that the user gains access to the ISP (Internet Service Provider) by telephone line, etc. and the ISP dynamically allocates the spooled IP addresses. Therefore, as the IP address varies whenever the user connects to the ISP, each user has to identify its partner on the network from the IP address, which may be subject to change as occasion arises. Therefore, under the current network infrastructure, a system to replace an IP address corresponding to a dynamic change of IP address is required. Also, in order to get the most out of collaboration on a network, it is important to manage scheduling or log of conference to be held. Also, especially, by automation of opening or resuming a conference, collaboration can be embodied on a network on-scheduled timetable. Moreover, to open a conference on a network, it is important to distribute data of the conference. Moreover, in order to resume the conference, it is necessary to effectively use the log of the conference. As the data or log of the conference can surely contain massive amounts of information, effective distribution method is important. Moreover, in order to ensure smooth communication as if users are really on the site, at the time of collaboration, such means as adding notes, inserting drawings, etc. are extremely effective. In the past, collaboration like adding notes or free-hand drawing had to be developed for every specific application, and development cost amounting to a considerable amount has been a problem.

SUMMARY OF THE INVENTION

According to the present invention there are provided a collaboration method, system, program and record medium allowing the user to easily find out and invite a connecting partner in peer-to-peer type collaboration, and further allowing proper distribution of data or conference logs and proper sharing of application.

A first aspect of the present invention provides a collaboration method effected through a peer-to-peer network, the method comprising a mail sending step which includes sending an electronic mail to a plurality of conferee peers (peer machines 10-2 and 10-3), the electronic mail having a URL of a conference host peer (peer machine 10-1) described thereon for automatically taking part in a conference by clicking once; and a data distribution step which includes searching a conferee peer at a shortest time location through communication tests from the conference host peer to distribute data, and, after distribution of data, informing remaining conferee peers that the data distributed conferee peer is a mirror of the remaining conferee peers, and searching a conferee peer at a shortest time location through communication tests from the conference host peer and from the mirror to distribute data, the above processes being repeated until data distribution completes. As described above, according to the present invention, when a host who intends to hold a conference sends an electronic mail describing host's own URL to a partner to be invited to a conference, those who want to take part in the conference can automatically take in the conference by a simple operation like clicking the URL described on the received electronic mail. At the same time, data can be distributed to peers effectively, in order of shortest time location, starting from the shortest time location, as a result of searching an optimum route by trial sending of data required for the conference.

In the mail sending step, when the conference host peer has a global IP address, the URL on the electronic mail includes an HTML file and the HTML file has an URL of the host peer for use in peer connection. For this reason, a network environment like IPV6 is preferred because an IP address is added to each peer.

In the mail sending step, if the conference host peer does not have the global IP address, then the URL described on the electronic mail can be a URL of an Internet Service Provider (ISP) that dynamically allocates IP addresses, and the URL described on the HTML file can be a temporary URL, for use in peer connection, allocated from the Internet service provider to the conference host peer. Because of this, even if under the network environment where users do not have global IP addresses like nowadays, the system can be applied properly. In the mail sending step, a specified time to start a conference and the URL are described on the electronic mail so that the conferee peers are kept on standby and activated at the specified time so as to allow the conferee pears to automatically take part in the conference. Because of this, a conferee peer can automatically start a conference at a predetermined time. If there is a time lag with the mail sender side upon reception of an electronic mail, the conferee peer is activated by a timer notice at a specified time after correction of the time lag so as to allow the conferee peer to automatically take part in a conference. By doing so, even if each peer has a time error, conference can be started automatically at a specified time under the management of the host peer. If there is a time lag with the mail sender side upon reception of an electric mail, the conferee peer may automatically correct the system time of the mail receiver side into the system time of the mail sender side and activate by a timer notice at a specified time so as to allow the conferee peer to automatically take part in a conference.

In the data distribution step, when a conferee peer to be a data requester receives a plurality of addresses of data distributors, the conferee peer searches a data distributor at a shortest time location through a communication test to each data distributor and requests data distribution of the data distributor at a shortest time location. In this manner, by sending a distribution request after searching the data distributor at the shortest time location from the data receive side, in combination with search of data distribution destination at the shortest time location made by the data sender, the data distribution to all data distribution destinations can be finished in a short period of time, and, even if conferees are spread in a plurality of countries across the borders, the data distribution can be effectively completed. The data distribution step includes allowing conference data as the data to be automatically distributed from the conference host peer to all conferee peers or to a conferee peer that made a request. In this case, the data distribution step includes allowing conference data to be automatically distributed before the conference starts through connection of the conference host peer and the conferee peers. The data distribution before the conference starts is required when the conference data is in massive amount. The data distribution step includes allowing a conference log of the previous conference to be automatically distributed as the data from the conference host peer to all conferee peers or a conferee peer that made a request. The data distribution step may include allowing the conference log of the previous conference to be distributed from a certain peer to only conferee peers that took part halfway in the conference. The present invention further comprises an application sharing step which includes sharing any application currently running on a plurality of conferee peers inclusive of the conference host peer while a conference is being held, and free-hand drawing or entering notes onto images generated by the application. Because of this, without the need to prepare a communication function for every application of each peer, conferees can advance a conference while writing by free hand, sharing a screen created by the application. The application sharing step includes uploading images containing free-hand drawing to a Web server so as to allow a browse by the browser. In other words, the application sharing step includes arranging, on a Web screen to be browsed, URLs of conferee peers for automatically taking part in a conference only by clicking once. By releasing of the application screen during such conference on the Internet as a web screen, it will be possible to positively urge much more users who did not receive electronic mails, to take part in the conference, making the contents of the conference known to many persons.

A second aspect of the present invention provides a collaboration system by a peer-to-peer network. The system comprises a mail sending unit which sends an electronic mail to a plurality of conferee peers, the electronic mail having a URL of a conference host peer described thereon for automatically taking part in a conference by clicking once; and a data distribution unit which searches a conferee peer at a shortest time location through communication tests from the conference host peer to distribution data, and, after distribution of data, informs remaining conferee peers that the data distributed conferee peer is a mirror of the remaining conferee peers, and searches a conferee peer at a shortest time location through communication tests from the conference host peer and from the mirror to distribute data, the data distribution unit repeating the above processes until data distribution completes.

A third aspect of the present invention provides a program for the peer-to-peer network based collaboration system. The program allows a computer to execute a mail sending step which includes sending an electronic mail to a plurality of conferee peers, the electronic mail having a URL of a conference host peer described thereon for automatically taking part in a conference by clicking once; and a data distribution step which includes searching a conferee peer at a shortest time location through communication tests from the conference host peer to distribute data, and, after distribution of data, informing remaining conferee peers that the data distributed conferee peer is a mirror of the remaining conferee peers, and searching a conferee peer at a shortest time location through communication tests from the conference host peer and from the mirror to distribute data, the above processes being repeated until data distribution completes.

A fourth aspect of the present invention provides a computer readable record medium having a peer-to-peer network based collaboration program stored thereon. The program allows a computer to execute a mail sending step which includes sending an electronic mail to a plurality of conferee peers, the electronic mail having a URL of a conference host peer described thereon for automatically taking part in a conference by clicking once; and a data distribution step which includes searching a conferee peer at a shortest time location through communication tests from the conference host peer to distribute data, and, after distribution of data, informing remaining conferee peers that the data distributed conferee peer is a mirror of the remaining conferee peers, and searching a conferee peer at a shortest time location through communication tests from the conference host peer and from the mirror to distribute data, the above processes being repeated until data distribution completes.

Details of the collaboration system, program and record medium will be substantially the same as those of the method.

The above and other objects, aspects, features and advantages of the present invention will become more apparent from the following detailed description when read in conjunction with the accompanying drawings.

BRIEF DESCRIPTION OF THE DRAWINGS

FIG. 6 illustrates a mailing screen in accordance with the present invention;

FIG. 7 illustrates a mail-receiving screen in accordance with the present invention;

FIGS. 8A and 8B illustrate examples of how to describe a URL and an HTML file on sending mail;

FIG. 9 is a flowchart of a basic conference opening process by sending mail according to the present invention;

FIG. 10 illustrates another embodiment of the present invention to describe an IP address allocated from the ISP server on the HTML file;

FIGS. 11A and 11B are flowcharts of processing in accordance with the present invention to automatically open a conference at the time specified by sending mail;

FIGS. 12A and 12B are flowcharts of processing in accordance with the present invention to automatically open a conference, compensating the opening time by the difference of the system time specified by sending mail;

FIG. 13 is a flowchart of processing to distribute conference data from a host peer machine in the present invention;

FIG. 15 is a flowchart of data request process from a receiver side received an IP address of a data distributor;

DESCRIPTION OF THE PREFERRED EMBODIMENT

Figure 1A:
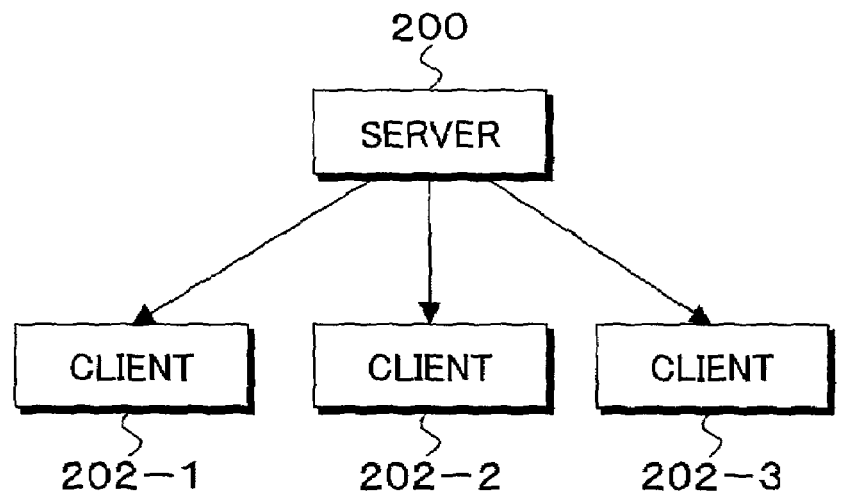
FIG. 1 illustrates configurations of a conventional server/client type network and a peer-to-peer type network.
Figure 1B:
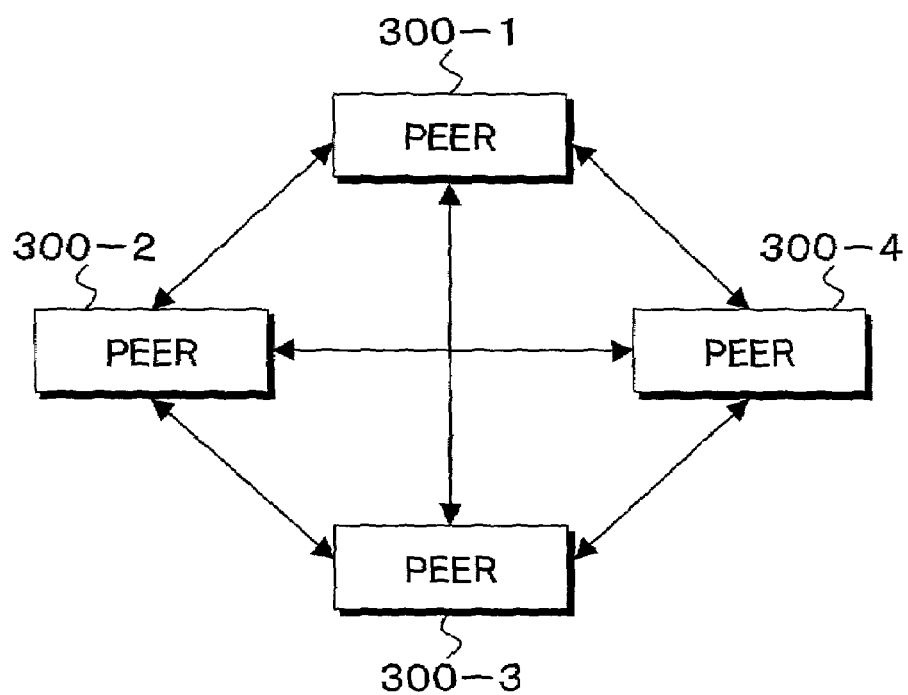
Figure 2:
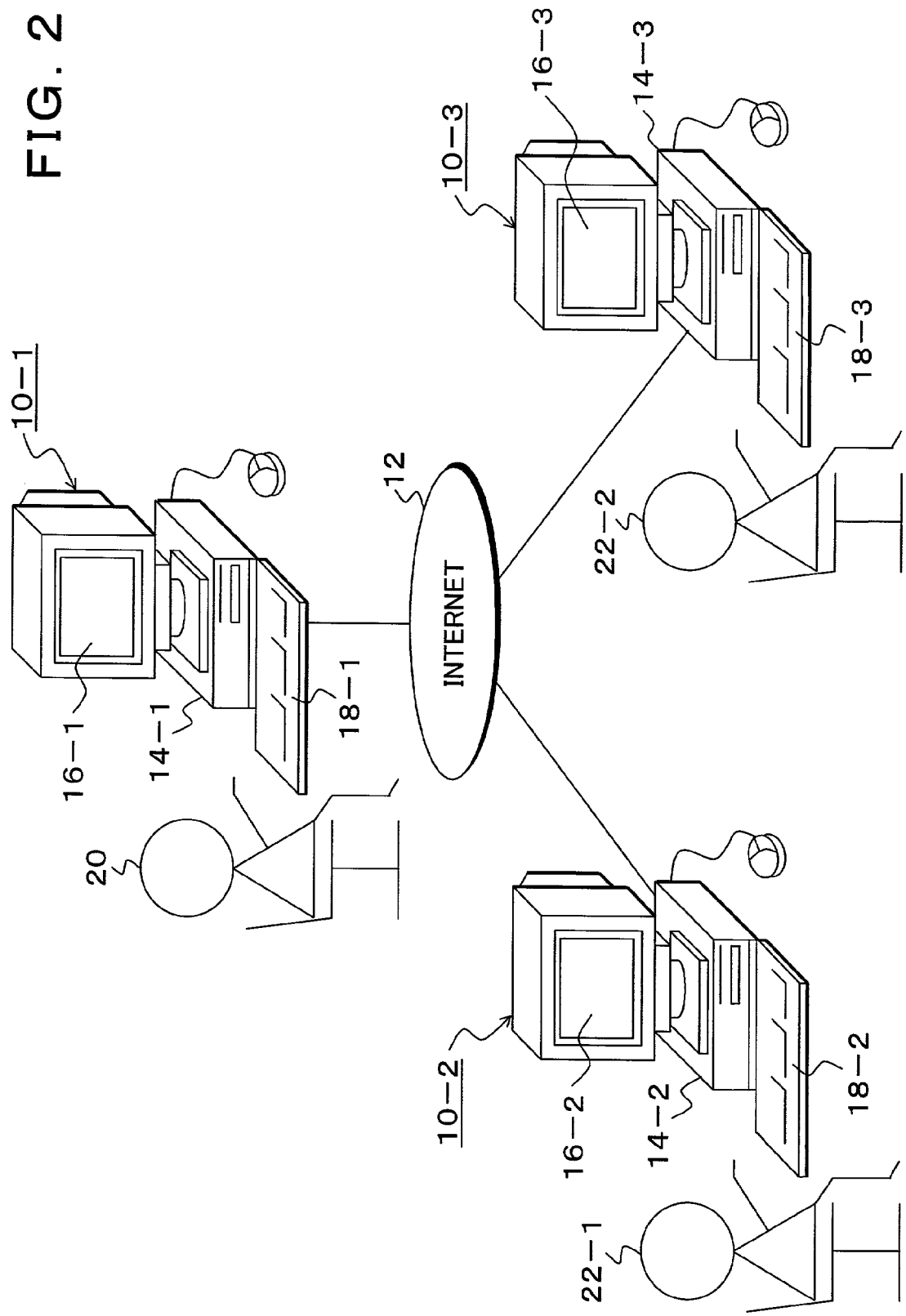
FIG. 2 illustrates a configuration of the peer-to-peer type network applicable to the present invention.

FIG. 2 illustrates a configuration of a peer-to-peer type network to which the collaboration system of the present invention is applied. As an example, such a case is taken, that where a peer machine 10-1 is a machine of a conference host 20, and against this, there are peer machines 10-2 and 10-3 as machines of conferees 22-1 and 22-2. The peer machines 10-1 through 10-3 are mutually connected through the Internet 12, and collaboration can be made by a network configuration of a peer-to-peer type. The peer machines 10-1 through 10-3 are a computer system comprising operation units 18-2 and 18-3 having main bodies 14-1 through 14-3, display units 16-1 through 16-3 using a color display, and in addition, a keyboard and a mouse.

Figure 3:
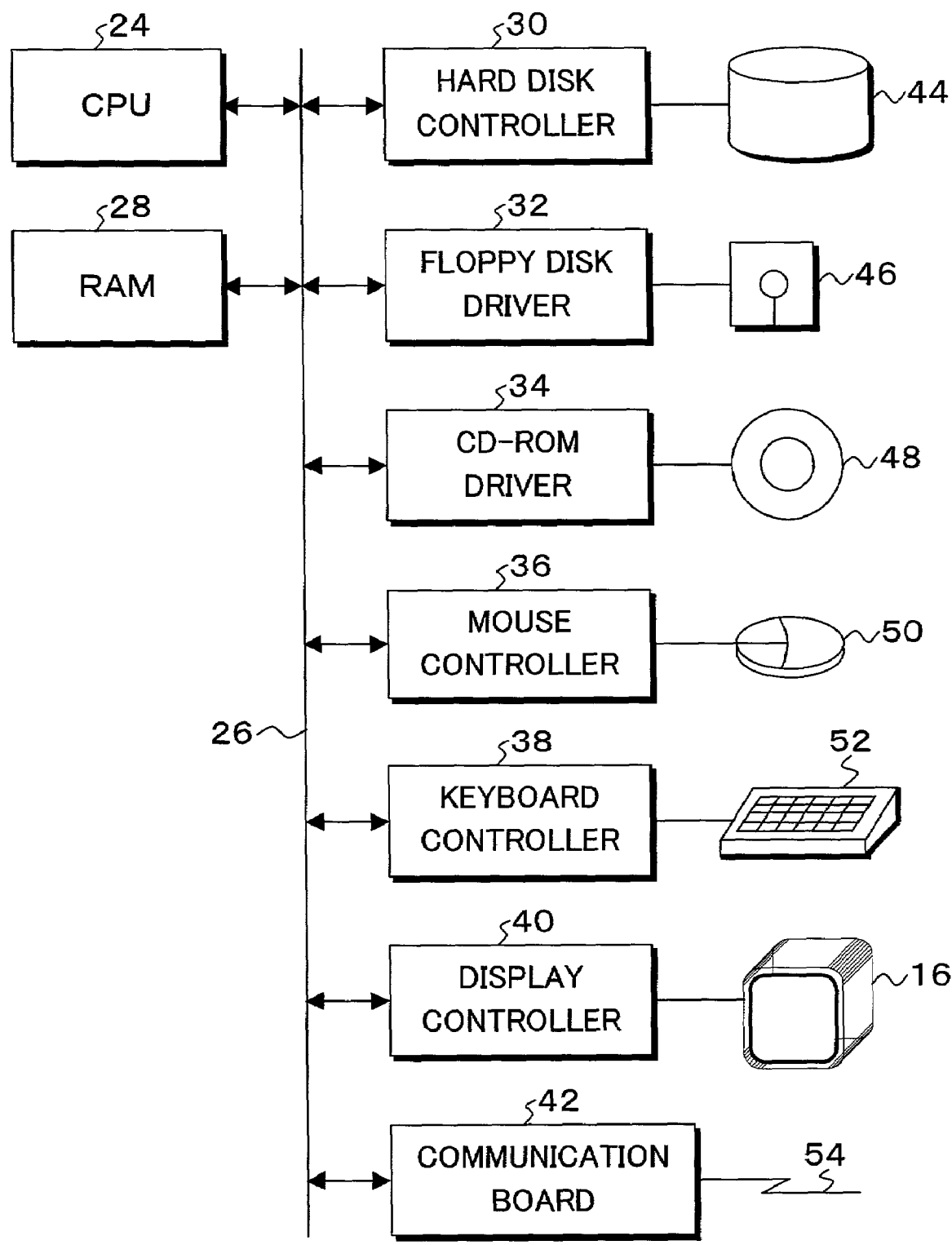
FIG. 3 shows a configuration of hardware of the peer machine shown in FIG. 2.

FIG. 3 shows an example of hardware configuration of each of the peer machines 10-1 through 10-3 shown in FIG. 2. To a bus 26 of a CPU 24, RAM 28, a hard disk controller 30, a floppy disk driver (software) 32, a CD-ROM driver (software) 34, a mouse controller 36, a keyboard controller 38, a display controller 40 and a communication keyboard 42 are connected. The hard disk controller 30 connects a hard disk 44, loading an application program to embody the collaboration system of the present invention, and when the peer machine turns ON, a collaboration program read out from the hard disk drive 44 is developed on RAM 28, and executed by the CPU 24. To the floppy disk driver (software) 32, a floppy disk drive (hardware) is connected, so that reading/writing of a floppy disk can be made. To the CD-ROM driver (software) 34, a CD drive (hardware) is connected, so that a data or program recorded on the CD can be read. The mouse controller 36 informs the CPU 24 of the entry operation of a mouse 50. The keyboard controller informs the CPU 24 of the entry operation of a keyboard 52. The display controller 40 displays data on a display unit 16. The communication board 42 makes communication with another peer machine via the Internet 12 through a communication line 54.

Figure 4:
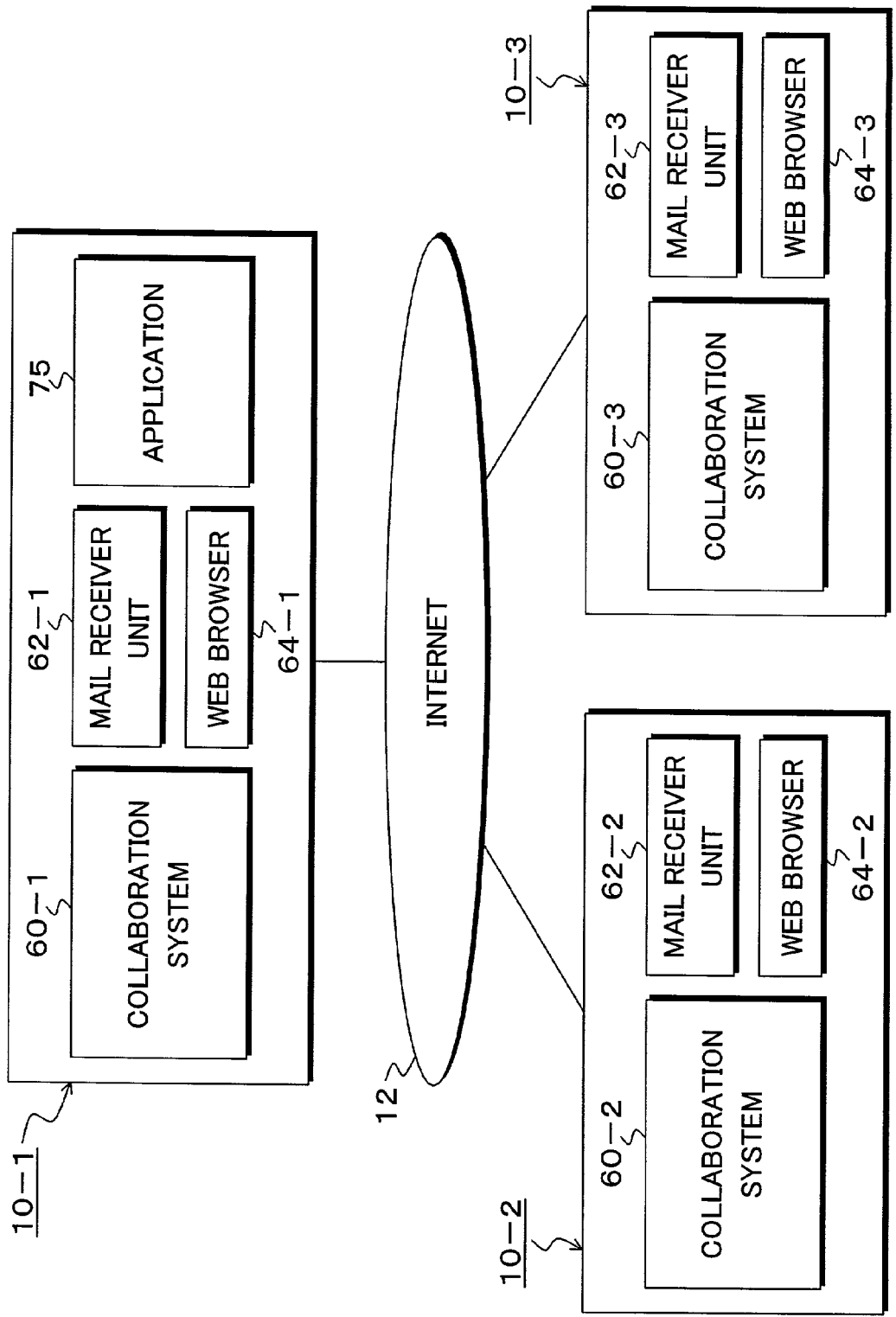
FIG. 4 is a block diagram of functional configuration with the collaboration system in accordance with the present invention placed to the network configuration shown in FIG. 2.

FIG. 4 is a block diagram of functional configuration with the collaboration system of the present invention put in the network configuration of the peer-to-peer type shown in FIG. 2. To the peer machine to be used by the conference host, the collaboration system 60-1 of the present invention, a mail-receiving unit (mail-receiving program) 62-1, a WEB browser 64-1, and further an application 75 to be the topic at peer-to-peer connection by the collaboration system, are installed. While to the peer machines 10-2 and 10-3 to be used by conferees, the collaboration systems 60-2 and 60-3 in accordance with the present invention, a mail receiving-units (mail-receiving programs) 62-2 and 62-3, and WEB browsers 64-2 and 64-3 are installed. The collaboration system 60-1 installed to the peer machine 10-1 used by the conference host sends electronic mail to a partner whom the host is hoping to encourage to take part in a conference. When the conference host sends electronic mail from the peer machine 10-1, for instance, to the peer machines 10-2 and 10-3, encouraging the partners to take part in a conference, the host is to describe a URL of the peer machine 10-1, conference host, on electronic mail to be sent, so that the receiver of electronic mail can automatically take part in a conference by only clicking the URL once. Receiving electronic mail from the peer machine 10-1, conference host, the peer machines 10-2 and 10-3 open the received mail by electronic mail-receiving units 62-2 and 62-3, and when the URL of the peer machine 10-1, conference host, is clicked once by a mouse, the individual collaboration systems 60-2 and 60-3 automatically start up, connecting to the collaboration system 60-1 of the peer machine 10-1, conference host, through the Internet 12, so that peer-to-peer type collaboration can be performed. Here, the embodiment shown in FIG. 4 shows a state, in which the individual collaboration systems 60-1, 60-2 and 60-3 are installed for the peer machine 10-1, conference host, and peer machines 10-2 and 10-3, conferees, however, as another embodiment, it can be also designed to download from the peer machine 10-1, conference host. In other words, such an embodiment can be taken that the collaboration system 60-1 is to be installed beforehand only to the peer machine 10-1, conference host, and the peer machines 10-2 and 10-3, conferees, received electronic mail from the peer machine 10-1, click that URL and connect to the peer machine 10-1 to download the collaboration system.

Figure 5:
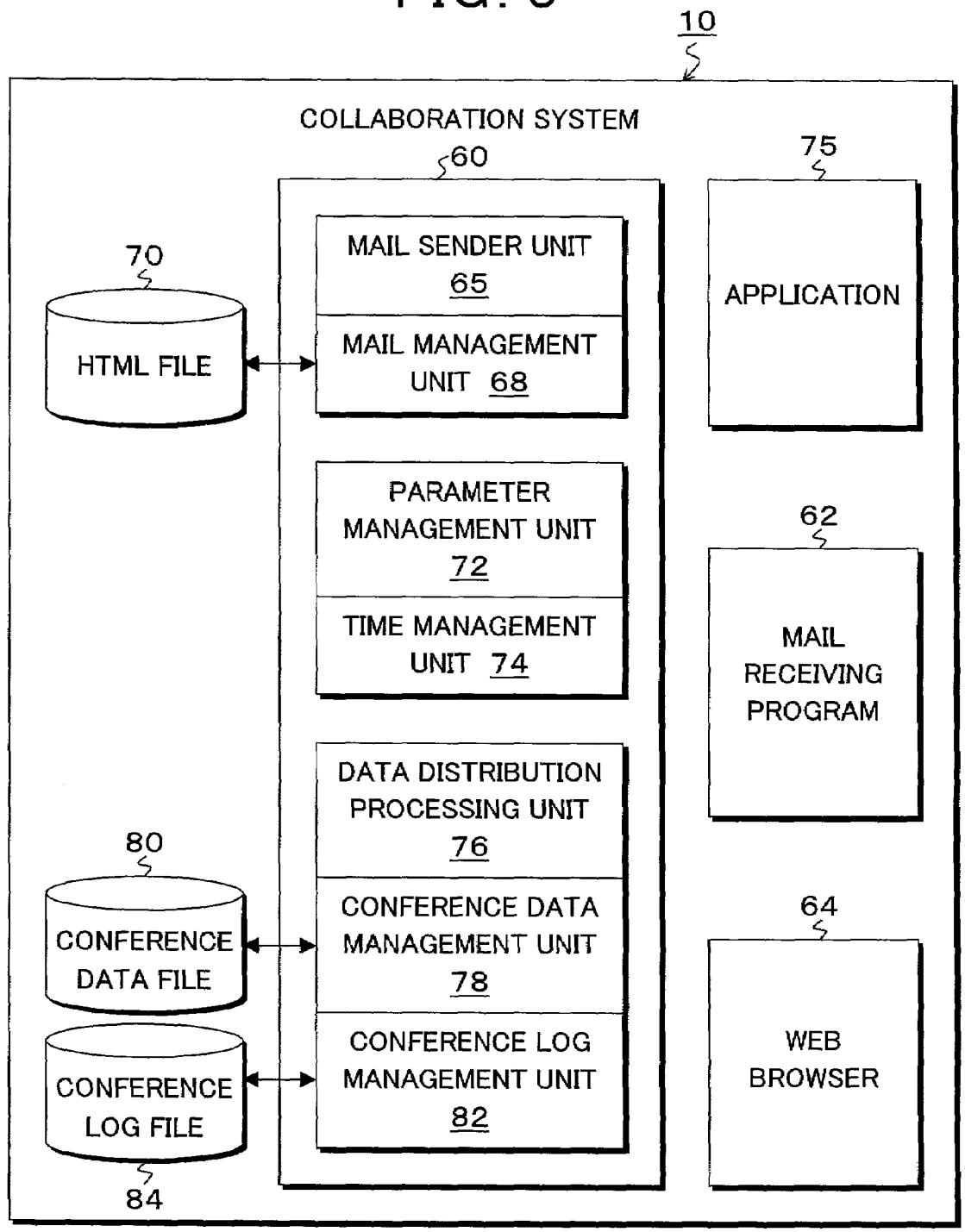
FIG. 5 is a block diagram showing details of the functional configuration of the peer machine shown in FIG. 4.

FIG. 5 shows a function of the collaboration system 60-1 installed to the peer machine 10-1 shown in FIG. 4. To the collaboration system 60-1, a mail sending unit 65, an HTML management unit 68, a parameter management unit 72, a time management unit 74, a data distribution processing unit 76, a conference data management unit 78, and a conference log management unit 82 are installed. The HTML management unit 68 manages an HTML file 70 created beforehand. The conference data management unit 78 manages a conference data file 80 prepared beforehand. The conference log management unit 82 manages a conference log file 84 generated at the conferences up to the previous conference. Electronic mail sending unit 65 sends electronic mail to a partner peer machine, encouraging the peer to take part in a conference, by the operation of the conference host. Latent partners, the host is hoping to encourage them to take part in a conference, can be selected, for instance, from mail addresses classified by the subject, through a simple mouse operation. Also, at electronic mail sending unit 65, setting can be also be made, on a summery of a conference, or starting time.

FIG. 6 illustrates a mail sending screen to be used at electronic mail sending unit 65. This mail sending screen 86 has a title 88, a destination 90 describing the address of a partner peer machine to be encouraged to take part in a conference, a same information 92, a mail-writing unit 94, a starting time 96, a conference name 98, and further a URL 100 for taking part in a conference. When electronic mail is sent with this mail sending screen set, for instance, the side of the peer machines 10-2 and 10-3 to be conferees shown in FIG. 4, electronic mail-receiving units 62-2 and 62-3 display a mail-receiving screen 102 as shown in FIG. 7. On electronic mail-receiving screen 102, a URL 106 for taking part in a conference is displayed on the lower side of the main body of electronic mail. As described above, when the user received electronic mail from the conference host clicks the URL 106 for taking part in a conference on electronic mail-receiving screen 102, the contents of the clicked URL will be displayed on the WEB browser. At this time, by describing of evidence information on the HTML file 70 of the URL 106 for taking part in a conference, the collaboration system 60 starts up automatically from the WEB browser 64.

FIG. 8A takes out a URL 100 for taking part in a conference described on electronic mail. In this URL 100 for taking part in a conference, the first "10. 25. 184. 145" indicates the IP address of the peer machine 10-1 of the conference host who sent electronic mail. The next "9912" is time information indicating the sending time of electronic mail. At the last, a physical file "200108151625.htm" is described to be the HTML file 70 on the IP address "10. 25. 184. 145". In the physical file "200108151625.htm", the HTML file 70 to be the text shown in FIG. 8B is stored. In the text stored in the HTML file 70, "URL=Registered protocol name: Auxiliary information" is described, and when this URL is opened, the application corresponding to the registered protocol starts up with auxiliary information as argument. In short, in the HTML file 70, when the URL is opened, the collaboration system, an application, corresponding to the registered protocol "FjDirectShare" starts running as the IP address "10.25.184.145" as argument. And as this IP address is the address of the conference host, the peer machine of the conferee that clicked the URL for taking part in a conference on the received mail, and the peer machine of the conference host who sent electronic mail are connected in peer-to-peer method.

FIG. 9 is a flowchart of a basic conference opening process by sending electronic mail in the collaboration system in accordance with the present invention. A conference host 20 first creates the HTML file 70 shown in FIG. 8B at a step S1. To create this HTML file 70, the conference host describes own IP address, for instance, like "10.25.184.145", in auxiliary information following the registered protocol name continued from the URL of the second line in the HTML file 70 shown in FIG. 8B, in short, on the URL to be described on electronic mail to be sent to the invitee to a conference. Then, at a step S2, the conference host 20 describes own URL on the URL 100 for taking part in a conference and sent, using electronic mail sending screen 86 shown in FIG. 6. As a matter of course, on electronic mail sending screen 86, the host enters a title 88, a destination of invitee of a conference 90, same information 92, if necessary, a mail-writing unit 94, a starting time 96, and further a conference name 98, and sends. A conferee 22-1 receives electronic mail from a conference host 20 at a step S101, and clicks a URL 106 for taking part in a conference contained in electronic mail, for the purpose of taking part in a conference, using a mail-receiving screen 102 as shown in FIG. 7. When the URL 106 for taking part in a conference is clicked, a WEB browser 64-2 displays the clicked URL at a step S102. Then at a step S103, at the time when the clicked URL is displayed, the collaboration system 60-2 corresponding to the registered protocol No. "FjDirectShare" in the URL starts running automatically with the URL "10.25.184.145", of auxiliary information as argument. The automatically started collaboration system 60-2 starts connection at a steep S104, recognizing, from argument, the IP address "10.25.184.145" of the peer machine 10-1 of the conference host to be the connecting destination, and by this connection, peer-to-peer connection of the collaboration systems 60-1 and 60-2 between the conference host and conferee clicked electronic mail is made, so that conference can be started. In the same manner as described above, as to electronic mail sent from the conference host 20 to the peer machine 10-3 of the conferee 22-2, clicking the URL for taking part in a conference automatically opens a conference.

FIG. 10 is a block diagram of an embodiment to automatically start a conference by a collaboration system using a temporary IP address allocated from the ISP server, because the peer machine 10-1 of the conference host does not have a global IP address. At the peer machine 10-1 of the conference host, and the peer machines 10-2 and 10-3 of the conferees, the collaboration systems 60-1 through 60-3, electronic mail receiving units (mail-receiving programs) 62-1 through 62-3 and the WEB browsers 64-1 through 64-3 are the same as in the case where the peer machine 10-1 has the global IP address shown in FIG. 4, however, the ISP server for allocating an IP address to the peer machine 10-1 is newly noted in this drawing. In this embodiment, when the peer machine 10-1 of the conference host sends electronic mail to the conferee, before the electronic mail is sent, first from the peer machine 10-1, a dialup connection is made to the ISP server 108, to receive a temporary IP address to be allocated from the ISP server 108. By doing so as described above, using the allocated IP address, the allocated temporary IP address is described as auxiliary information following the registered protocol contained in the URL in the HTML file 70 shown in FIG. 8B. While, as the IP address of the URL 100 for taking part in a conference described on electronic mail shown in FIG. 8A, the global IP address of the ISP server 108 that allocates temporary IP addresses is described. In short, the URL 100 for taking part in a conference described in electronic mail shown in FIG. 9A is a fixed global line IP address, and the address described on the HTML file 70 corresponding to the URL shown in FIG. 8B can be made a temporary address. Therefore, at the peer machines 10-2 and 10-3 that received electronic mail for taking part in a conference from the peer machine 10-1 of the conference host shown in FIG. 10, by clicking of the URL 106 for taking part in a conference appearing on electronic mail-receiving screen as shown in FIG. 7, a temporary IP address can be allocated to the peer machine 10-1 from the ISP server 108, by dialup connection. So, even if the temporary IP address changes on the peer machine 10-1 of the conference host, the peer machines 10-2 and 10-3 that received electronic mail can acquire a temporary IP address currently allocated from the ISP server 108, through automatic dialup connection, by only clicking the URL contained in the received electronic mail once, updating the old IP address described in the HTML file 70, and after that, allowing the collaboration system to start running automatically, so that a conference can be started automatically, connecting to the peer machine 10-1, the conference host, automatically.

Figure 11B:
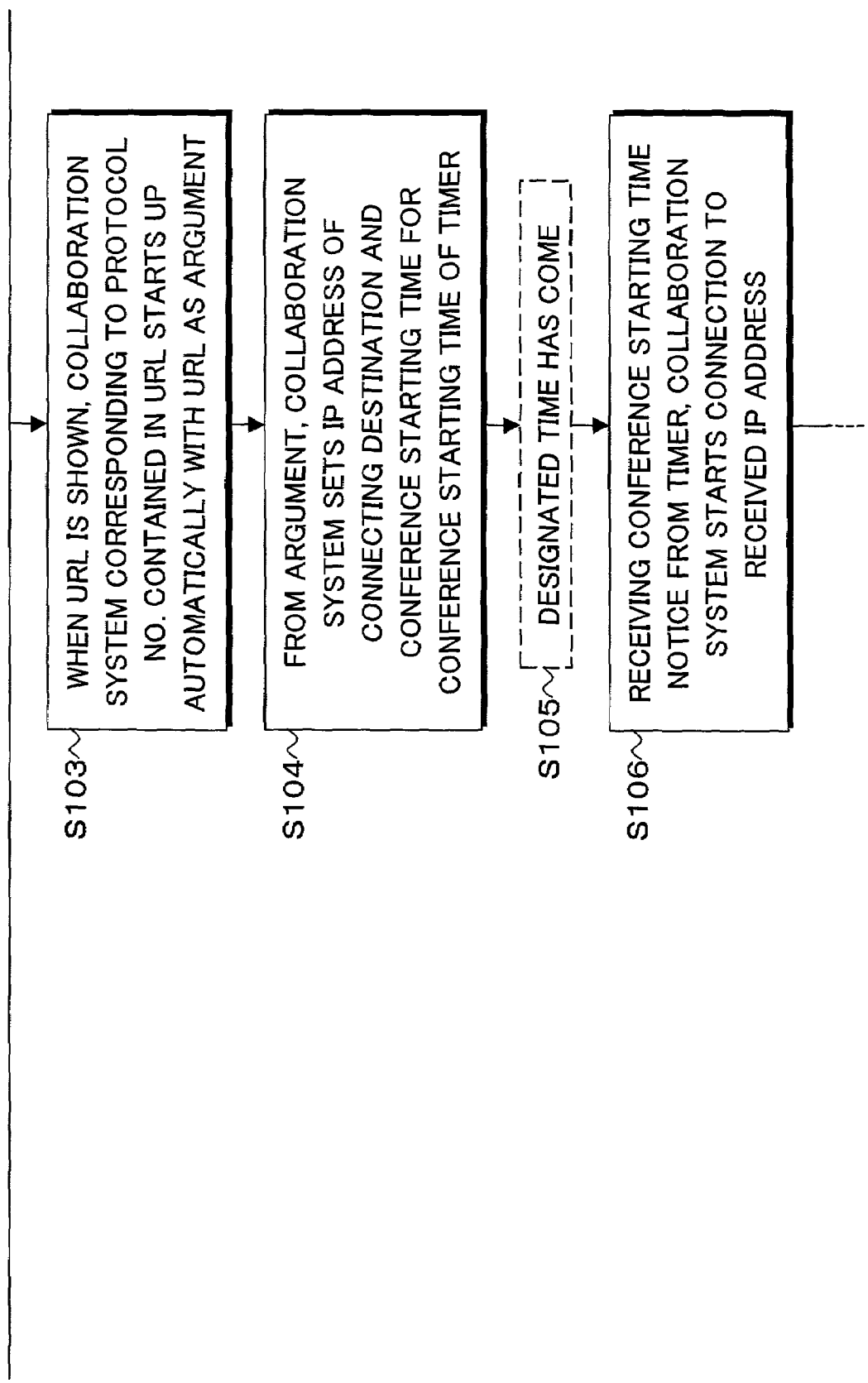

FIGS. 11A and 11B are flowcharts for automatically holding a conference at the time specified by electronic mail sent by the parameter management unit 72 and the time management unit 74 installed to the collaboration system 60 shown in FIG. 5. The conference host 20 creates the HTML file 70 at the step S1, and prepares electronic mail at the step S2 and sends to the conferee 22-1. The conferee 22-1 receives electronic mail at the step S101, and when the conferee clicks the URL contained in electronic mail, the browser displays the clicked URL at the step S102, and further at the step S103, the collaboration system corresponding to the protocol No. automatically starts running with the URL as argument. The processes up to this step are the same as the basic processing shown in FIG. 9. Then, at the step S104, the activated collaboration system 60-2 analyzes argument with the parameter management unit 72, and sets the conference starting time for the timer and starts the timer, so that the notification event takes place at the time when the conference starts. By activation of the timer by setting of the conference starting time as described above, at the step S105, the notification event takes place from the timer when the specified time comes, and the collaboration system 60-2 that received the notification of the conference starting time from the timer at the step S106 starts connecting to the received IP address, so that a conference can automatically begin at the specified time.

FIGS. 12A and 12B are flowcharts of processing that accompanied by time compensation processing in the case when the system time of the host and that of the conferee are different in automatically opening a conference by specifying of the time. The processes, including the creation of the HTML file and sending of electronic mail describing the URL for taking part in a conference at the steps S1 and S2 at the conference host 20, and further the automatic activation of the collaboration system by clicking of the URL for taking part in a conference contained in the received mail of the steps S101 through S103 at the conferee 22-1 are the same as shown in FIGS. 11A and 11B. Next, at the step S104, from argument, the activated collaboration system connects once to the IP address of the conference host 22, obtaining the difference in the system times, by exchanging each system time, and sets the conference starting time after compensating of the difference in the system times for the conference starting time of the timer. By this compensation, even if the system time of the conference host 20 differs from the system time of the conferee 22-1, by setting of the conference starting time after the difference in the system times being compensated, when the conference starting time scheduled by the conference host 20, and the same compensated time specified by the conferee 22-1 come, at the step S105, the timer delivers the notification event, and at the step S106, the collaboration system received the notification of the conference starting time from the timer starts connecting to the IP address of the conference host 20, allowing a conference to start automatically. In the process to automatically compensate the time difference by exchanging of each system time, it can be guaranteed that the difference between the system time of the conference host 20 and that of the conferee 22-1 would be within the range of error, usually within the range of not exceeding 2 or 3 seconds, about the sending time of a packet with a small amount required to exchange each system time or so. As another method to compensate the lag of the system times, in exchanging system times, connecting from the conferee 22-1 to the conference host 20, the system time of the conferee 22-1 can be corrected to the system time of the conference host 20.

Figure 14:
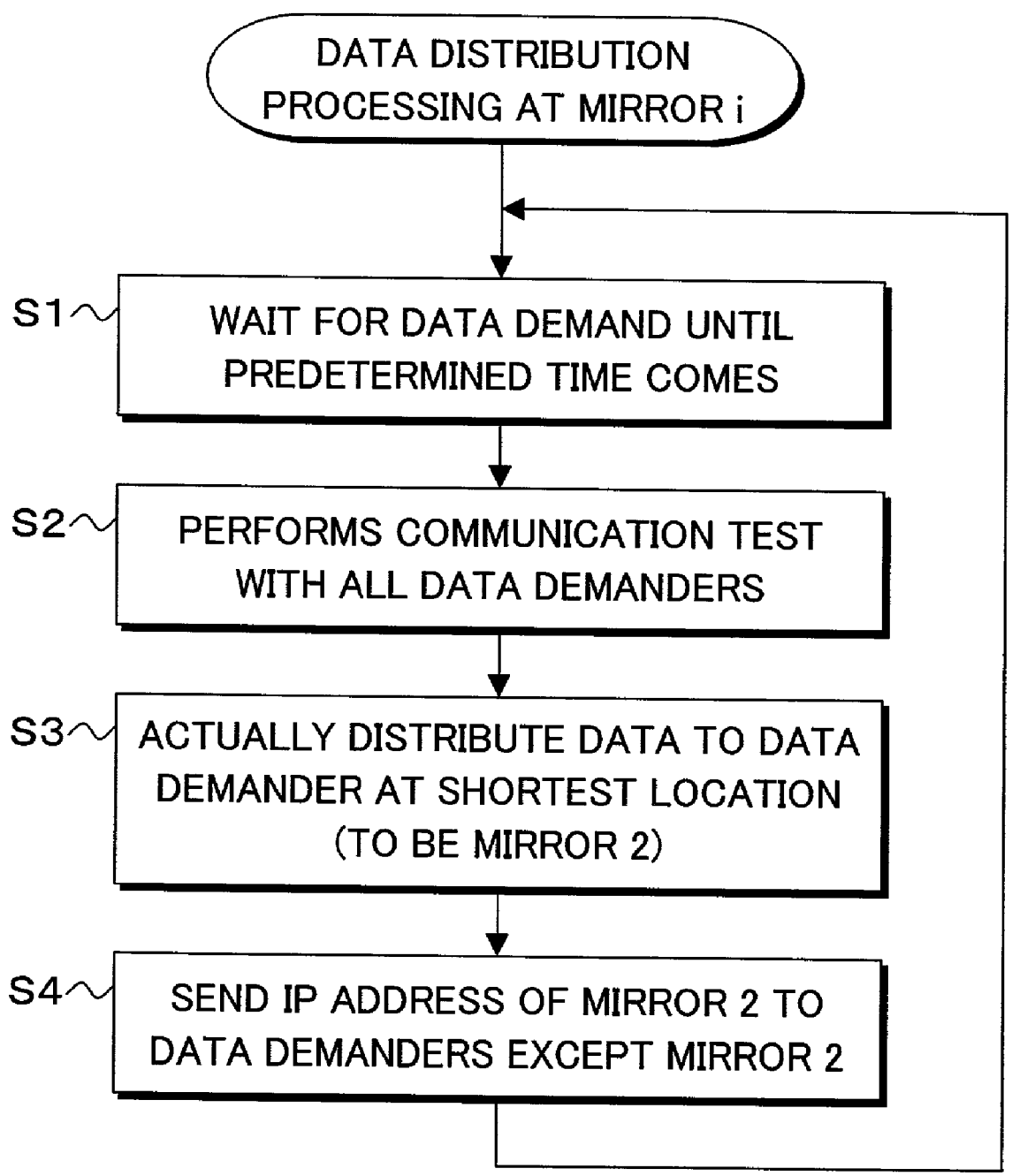
FIG. 14 is a flowchart of data distributing process by a mirror received the distributed conference data from the host peer machine.

Next, description is made about the conference data distribution process by the data distribution processing unit 76 and the conference data management unit 78 installed to the collaboration system 60 shown in FIG. 5. FIG. 13 is a flowchart of the data distribution processing by the data distribution-processing unit 76 of the peer machine 10-1 of the conference host. Interlocking with this data distribution processing of the conference host, there is a mirror distribution processing of the peer machine of the conferee that functions as a mirror of the data distributor that received the data distribution as shown in FIG. 14, and further there is processing to perform data request from the conferee side to the data sender shown in FIG. 15. A basic algorithm for distributing data in the collaboration system in accordance with the present invention is as follows:

(1) The data-receiving destination searches the data distributor to be the shortest time by a communication test using a packet of a small amount, and performs sending request;

(2) The data distributor that received the distribution request searches the data-distributing destination to be the shortest time, performing a distribution test using a packet of a small amount, and sends the data;

(3) The receiving destination that received data distribution becomes a mirror of the data distributor, and informs the other data distributing destinations that it became a mirror;

(4) The processes from (1) to (3) are repeated until distribution completes.

The following shows description about the data distribution process from the peer machine 10-1 to be the conference host shown in FIG. 13, following such a data distribution algorithm as described above. First of all, at the step S1, the conference host sends electronic mail informing of holding a conference to all conferees. The conferee that received this electronic mail sends a data request to the conference host to be the distributor, following the data request process of the receiver side shown in FIG. 15. Then, at the step S2 the conference host waits for data request until a predetermined time comes, and at the time when a predetermined time elapsed, at the step S3, the conference host performs a communication test using a packet of a small amount with all data requesters. Next, at the step S4, the conference host distributes data to the data requester in the position to be the shortest time as the result of a communication test. This data requester of the data-distributing destination becomes a mirror of the data-distributing source of the conference host because the requester received the data, and this mirror will be referred to as a mirror 1. Next, at the step S5, the conference host sends the IP address of the mirror 1 to all data requesters but the mirror 1. Then, the processes from the step S2 through the step S5 are repeated.

FIG. 14 is a flowchart of distribution processing of a mirror i by the conferee to be a mirror receiving data distribution from the conference host. The following shows description taking the case of the mirror 1 that first received data distribution from the conference host as a mirror i. At the step S1, the mirror 1 waits for data request until a predetermined time comes, and at the step S2, conducts a communication test using a packet of a small amount with all data requesters. From the result of this communication test, at the step S3, the mirror 1 actually distributes the data to the data requester at the location to be the shortest in terms of required time. This data-distributing destination is to be referred to as a mirror 2. And at the step S4, the mirror 1 sends the IP address of the mirror 2 to all data requesters but the mirror 2.

The following shows the data request process at the receiver side of the data distribution to be the conferee shown in FIG. 15. First at the step S1, the conferee receives the IP address of the data distributor. Next, at the step S2, a communication test is executed to the data-distributing destination with a small amount of packet. And at the step S3, the conferee sends a data request to the distributor from which the conferee received response in the shortest time.

Figure 16A:
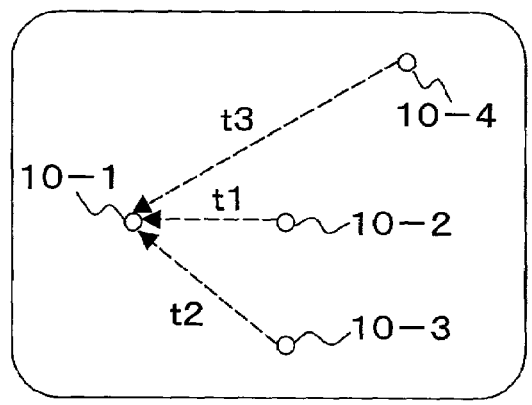
FIGS. 16A through 16H illustrate route search in data distribution process in accordance with the present invention.
Figure 16B:
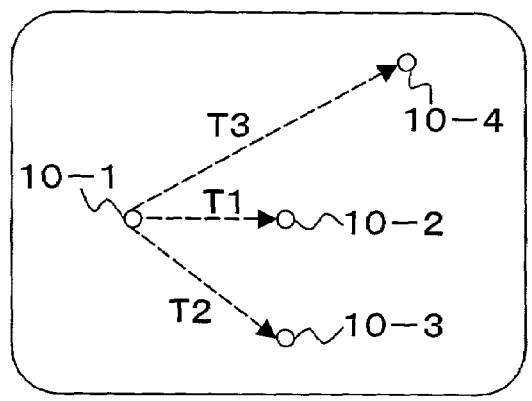
Figure 16C:
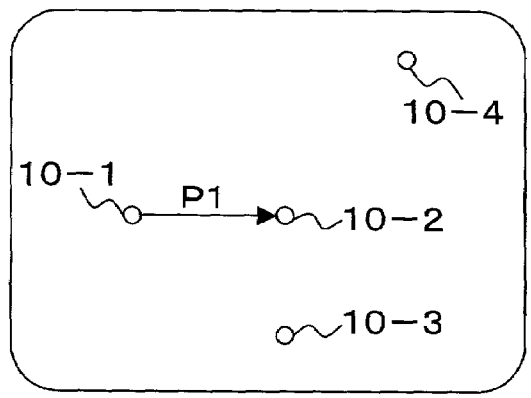
Figure 16D:
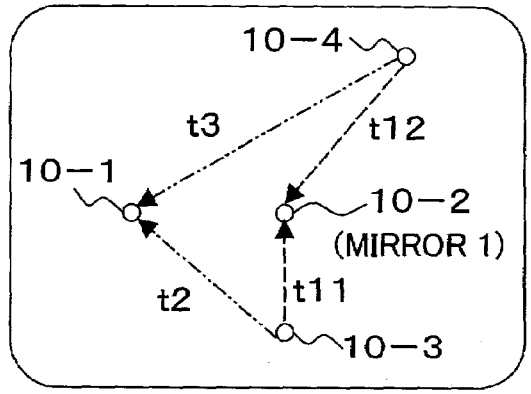
Figure 16E:
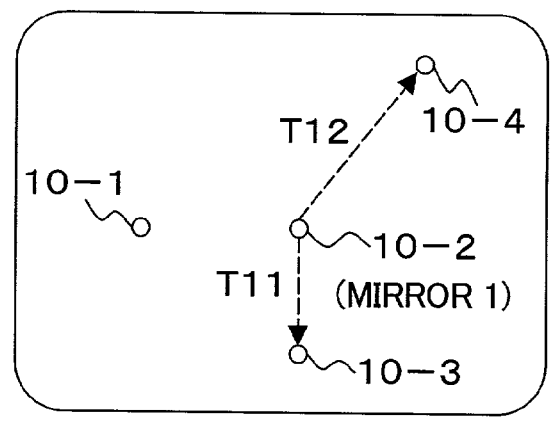
Figure 16F:
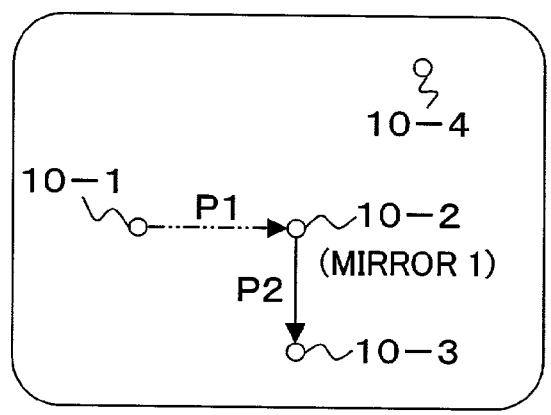
Figure 16G:
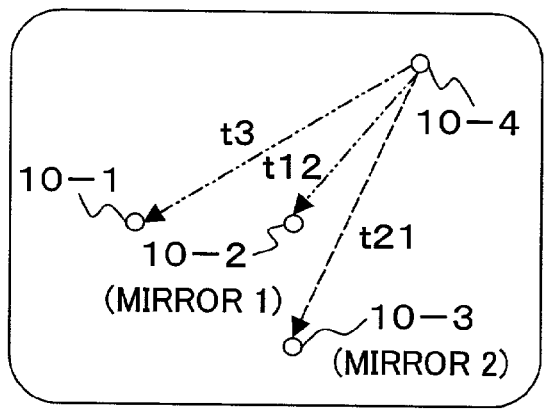
Figure 16H:
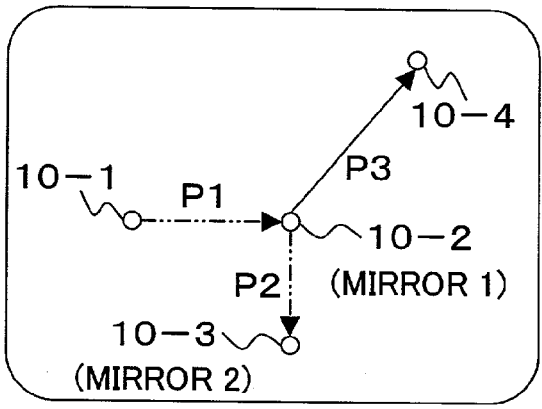

FIGS. 16A through 16H illustrate processing procedure of the data request and the data distribution following the data distribution algorithm shown in FIGS. 13 through 15, as to a plurality of peer machines, in terms of time-distance. FIG. 16A shows processing of data request after electronic mail is sent from the peer machine 10-1 of the conference host to the peer machines 10-2 through 10-4 of the conferees. Each of the peer machines 10-2 through 10-4 conducts a communication test to the peer machine 10-1 to be the data distributor, using a small amount of packet, and individually measures a communication time t1 t2 or t3 until response arrives. In this case, as the data distributor is only the peer machine 10-1, the peer machines 10-3 and 10-4 all perform a data request to the peer machine 10-1, regardless of communication time. FIG. 16B shows the communication test conducted by the peer machine 10-1 to be the distributor that received a data request from the peer machines 10-2 through 10-4. The peer machine 10-1 to be the data distributor conducts a communication test using a small amount of packet to the peer machines 10-2 and 10-3 to be the data distributing destinations, and measures communication times T1, T2 and T3. Here, if the communication time T1 is the shortest, as shown in FIG. 16C, the peer machine 10-1 actually sends the data to the peer machine 10-2 of the shortest time T1, thereby establishing a route P1. The peer machine 10-2 that received the data distribution through the route P1 becomes a mirror of the peer machine 10-1 of the data distributor, and the peer machine 10-1 informs the peer machines 10-3 and 10-4, the rest of the data distributing destinations that the peer machine 10-2 became a mirror. Next, as shown in FIG. 16D, a communication test is conducted from the peer machines 10-3 and 10-4 that do not receive data distribution, to the peer machine 10-1 to be the data distributor and the peer machine 10-2 to be a mirror. In this case, since as to the peer machine 10-1, the communication times t2 and t3 are already known from the communication test shown in FIG. 16A, the peer machines 10-3 and 10-4 conduct a communication test only to the peer machine 10-2 that newly became a mirror, and output communication times t11 and t12. Here, the communication times t2 and t1 from the peer machine 10-3 to each of the peer machine 10-1 and the peer machine 10-2 as a mirror are compared, and in this case, as the communication time t11 is the shortest, a data request is made to the mirror 10-2. Also, the peer machine 10-4 makes a data request to the mirror 10-2, the communication time t12 of which is shorter than the communication time t3 to the peer machine 10-1. Because of this, as shown in FIG. 16E, the mirror 10-2 receives from two data requests from the peer machines 10-3 and 10-4. Therefore, the mirror 10-2 conducts a communication test to the peer machines 10-3 and 10-4 to be the requesting destinations, to measure communication times T11 and T12. In this case, as the communication time T11 is shorter, as shown in FIG. 16F, the mirror 10-2 actually sends the data to the peer machine 10-3, the communication time T11 of which is the shortest, thereby establishing a route P2. At this time, the mirror 10-2 informs the remaining peer machine 10-4 that the peer machine 10-3, the actual data-sending destination, became a mirror 2. Then, as shown in FIG. 16G, the remaining peer machine 10-4 conducts a communication test, with the peer machine 10-1 as the data distributor, the peer machine 10-2 as the mirror 1, and the peer machine 10-3 as the mirror 2, as the distributors. As to the peer machines 10-1 and 10-2, since the communication times have been measured and the values of the t3 and t12 are already obtained, a communication test is conducted only to the peer machine 10-3 as the mirror 2 to measure communication time t21. Of communication times to these three distributors, the shortest communication time is t12, accordingly, the peer machine 10-4 makes a distribution request to the peer machine 10-2 as the mirror 1, and eventually as shown in FIG. 16H, data is actually sent from the peer machine 10-2 as the mirror 1 to the peer machine 10-4, thereby establishing a route P3. Here, FIGS. 16A through 16H take the case of data distribution by the four peer machines, 10-1 through 10-4, however, if there is an additional peer machine exists as the data-distributing destination, similar process would be repeated. Also in FIGS. 16A through 16H, the serial route tracing the peer machines orderly is established, however, if there are further a plurality of peer machines exist as the distributing destinations, parallel routes would be formed for distributing data from the peer machine 10-1 of the conference host and the peer machine that becomes a mirror by data distribution to different peer machines as distributing destinations, thereby data that is needed by the conferee can be distributed at high speed, within the shortest time.

Figure 17:
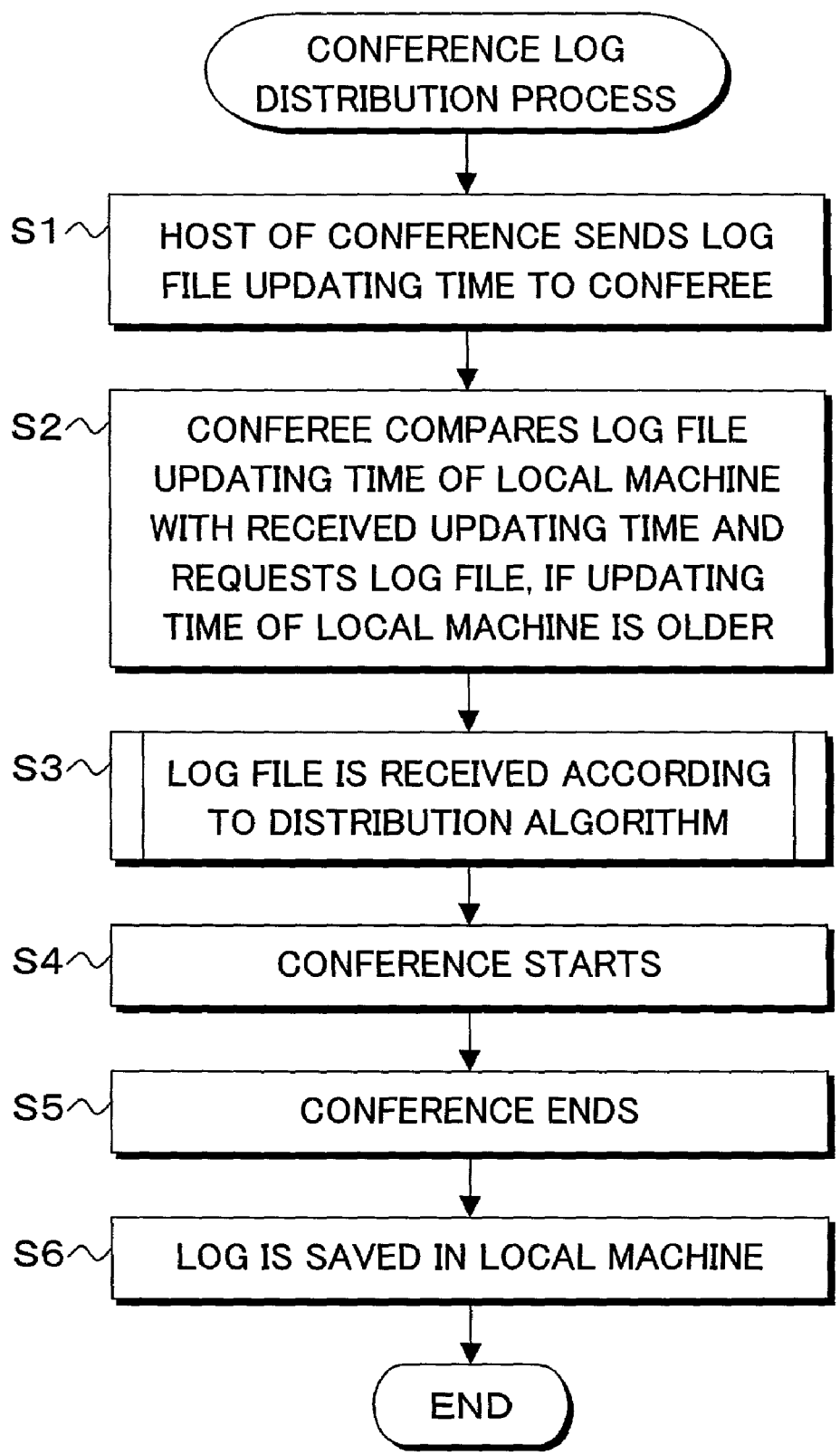
FIG. 17 is a flowchart of conference log distribution process in accordance with the present invention.

FIG. 17 is a flowchart of a conference log distribution process by the data distribution processing unit 76 and the conference log management unit 82 installed to the collaboration system 60 shown in FIG. 5. In the case of continuously performing a conference repeatedly by the peer-to-peer collaboration system in accordance with the present invention, the use of the log recorded at the previous conference is important. As to the conference log distribution process, at the step S1, the conference host sends the updating time of the log file to the conferee. Having received the updating time of the log file, the conferee at the step S2 compares the updating time of the log file of own peer machine that functions as a local machine, with the updating time received from the conference host, and requests the conference host for distributing the log file, if the updating time of the local machine is older. To the log file distribution request from the conferee, at the step S3, the log file is sent to the conferee that made the request, following the same distribution algorithm as in the case of the data distribution shown in FIGS. 13, 14 and 15. And at the step S4, a conference starts, for instance, due to an automatic conference holding method activated by the timer notification delivered at the time when the conference starting time set in the received mail reached, and when a series of conference ends at the step S5, at the step S6, the conference log is stored and the updating time is rewritten. Further, in the distribution process of the conference data or conference log, if enormous volumes of the data must be sent, the distribution process of the conference data or the conference log is executed in advance of starting up a conference. Also, in the distribution process of the conference data or the conference log, once the distribution routes P1, P2 and P3 have been established as shown in FIG. 16H, as to the following data distribution process, the constant use of the once established distribution route may be allowed.

Next, the following shows description about the process for allowing the conferees to share the application 75 currently in the ON state as the contents of review during the conference, on the collaboration system 60 shown in FIG. 5. In order to share the application on the network, until today, a communication function used to be developed for every application. While according to the present invention, the collaboration system 60 monitors the operation of the application 75, and sends the application screen generated by the operation of the application to other conferees, allowing the conferees to display the same screen on their monitor displays, so that the conferees can view the common application screen. At the same time, each conferee can send the application screen to other conferees, after adding a note or free-hand drawing to the page currently displayed on the conferee's own display unit. The following describes about such application sharing process as described above, referring to the flowchart shown in FIG. 18. At the step S1, the conference host selects an application to be shared. Next, at the step S2, the conference host pushes the drawing mode button for free-hand drawing. Then, at the step S3, the conference host captures the current application screen, and fixes the image to the upper of the Windows. And at the step S4, the conference host sends the fixed application image to other conferees. At this time, the application image is also sent at high speed using the route established by the communication test, for instance, conducted in the conference data distribution process. Next at the step S5, pasting chats or free-hand drawing to the application screen is performed between a conferee-to-conferee. When pasting chats or free-hand drawing is performed by specific conferees, the resultant screen is sent to other conferees, so that conferees can share the contents of the screen.

Figure 18:
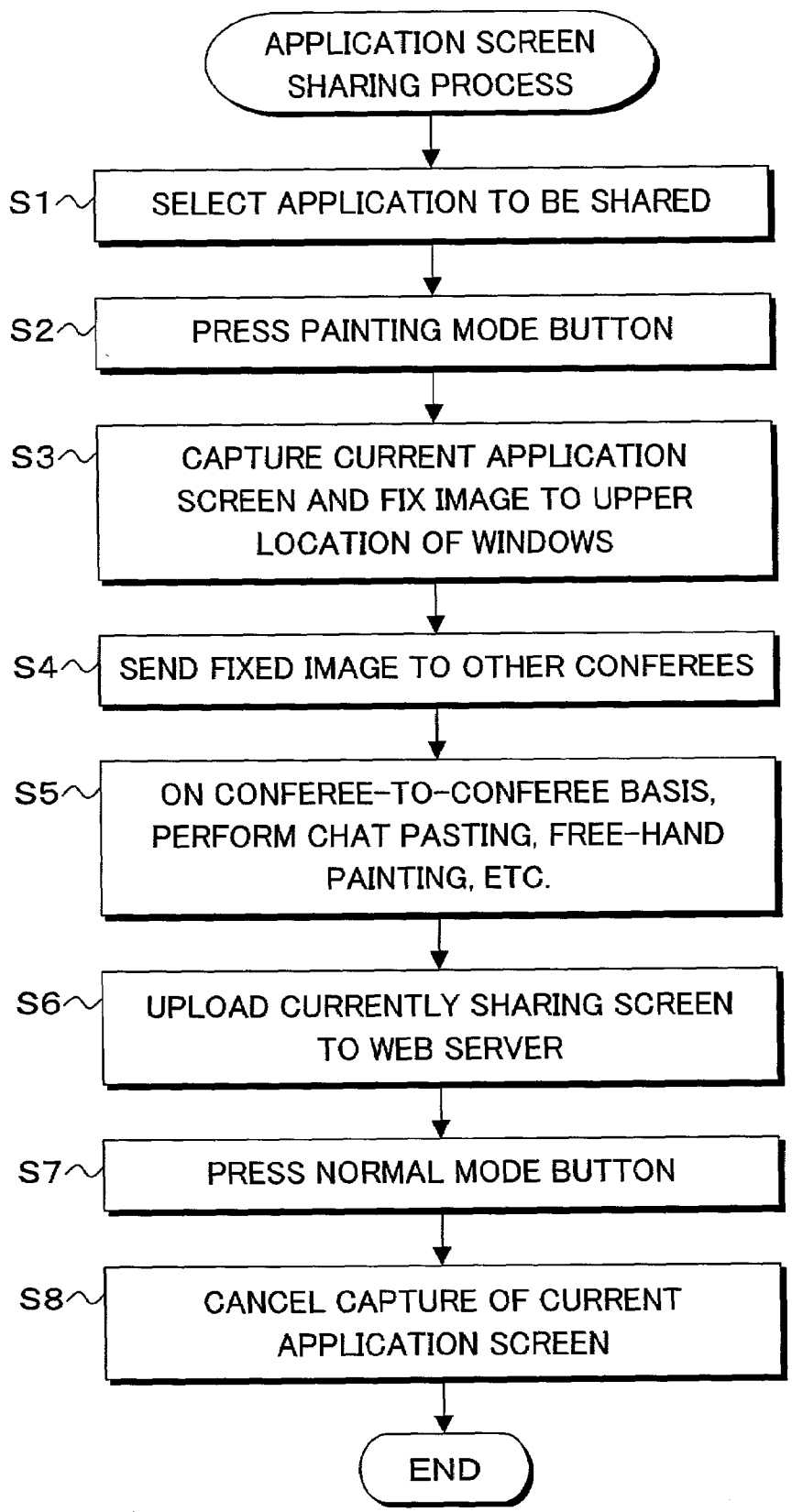
FIG. 18 is a flowchart of application sharing process in accordance with the present invention.
Figure 19:
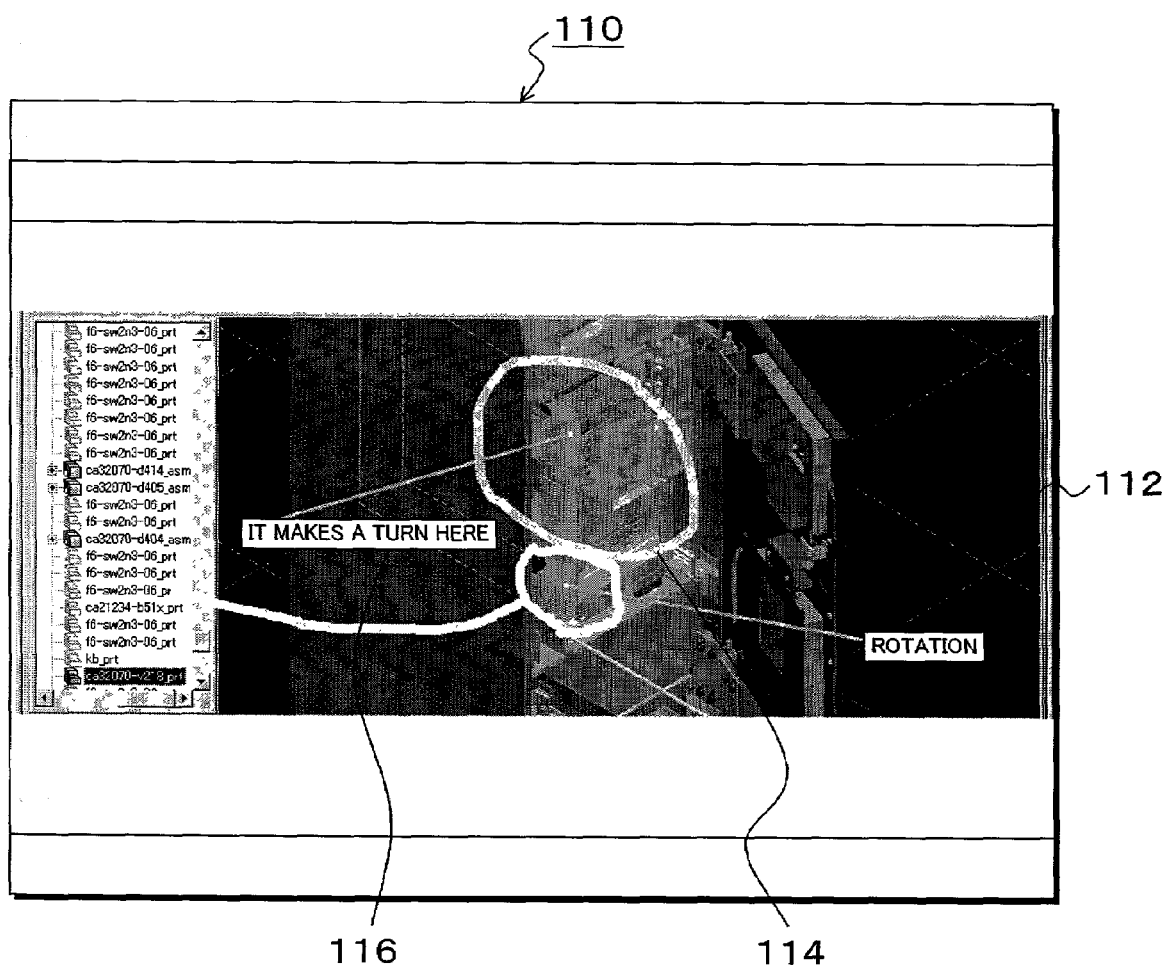
FIG. 19 illustrates an application sharing screen in accordance with the present invention.

FIG. 19 shows an example of the shared application screen by the steps S1 through S5 shown in FIG. 18, and in this example, a 3D system is activated as the application 75, and a designed 3D image 112 is displayed on an application sharing screen 110. To the 3D image 112 on the application sharing screen 110, the conferee draws a free-hand box 114 or pastes chats 116.

Figure 20:
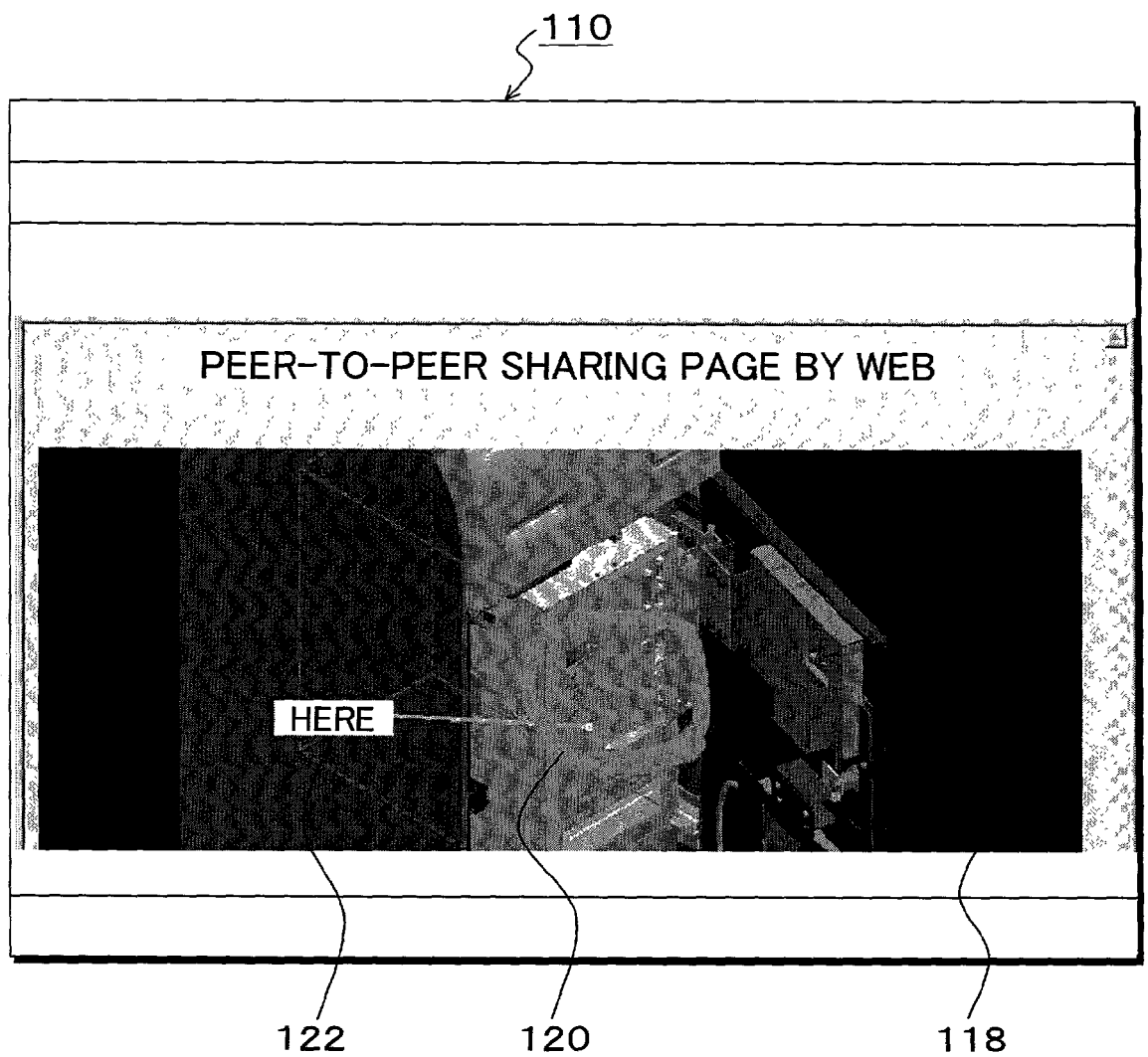
FIG. 20 illustrates an application sharing screen following FIG. 19.

FIG. 20 shows a 3D image 118, where the areas pointed out by the conference host that manages the application are magnified, as to the areas pointed out at the 3D image 112 on the application sharing screen 110 shown in FIG. 19, and to this magnified 3D image 118, free-hand drawing of a box 1120 and writing by chat 122 is made, thereby allowing conferees to understand elements why imperfections in the contents of the image being pointed out.

Again returning back to FIG. 18, in the application screen-sharing process according to the present invention, it is so programmed that each conferee can display the application screen pasting chats or free-hand drawing to the screen, and at the same time, at the step S6, any user can upload the currently supplied application sharing screen to any Web server, so that even users who do not take part in a conference can view the state of the conference from the driver. Because of this, at the step S7, when a user who does not take part in the conference gains access to the application sharing screen uploaded to the Web server by the browser, like the case of sending mail, as the URL for taking part in a conference is described on the browser screen, the user can take part in the conference by clicking a link from the browser screen. Next, at the step S7, when the normal mode button is pushed, the currently displayed application screen will be released from the captured state at the step S8.

Next, the following describes about a record medium storing a program for a collaboration system to embody the propagation of the peer-to-peer network according to the present invention. The program for the collaboration system in accordance with the present invention is recorded on a CD-ROM, a floppy disk, or other transportable record media, and installed as being set to a CD-ROM drive 34 or a floppy disk drive 32 for the peer machine having hardware configuration shown in FIG. 3, and further stored in a hard disk drive 44, from which the program is developed on RAM 28 as the main memory, so as to embody the function as the collaboration system 60 by being executed by a CPU 24. Also, the program for the collaboration system in accordance with the present invention is recorded on the record medium of another apparatus to be connected through a network, thus the program can be obtained, downloaded by using of a communication control device, and stored on an auxiliary storage or a main storage. Also the collaboration system in accordance with the present invention has processing functions of each part shown in FIG. 5, and by these functions, the collaboration system executes processing shown on the flowcharts shown in FIG. 9, FIGS. 11A and 11B, FIGS. 12 through 15, and further FIGS. 17 and 18.

As described above, according to the present invention, the users can automatically take part in a conference by simple operation, in short, a host who wants to hold a conference is to send electronic mail describing own URL to a partner to be encouraged to take part in a conference, and a conferee is to click the URL described on the received electronic mail, thus, a plurality of users can simply and effectively discuss at a conference, etc. using electronic mail.

Also, data required for a conference can be distributed at high speed through the route established by an optimum route search to be the shortest communication time, by a trial sending at each of the receiver side and the sending side.

In addition, as to the case where the conference host does not have a global IP address and received a temporary IP address allocated from the ISP server, with a pre-condition that the host is to set a global IP address of the ISP server to the URL for taking part in a conference on electronic mail, and to describe the temporary IP address on the HTML file, even if the temporary IP address is updated, the users can continuously take part in a conference automatically by clicking the URL for taking part in a conference by the received mail before updating.

Moreover, in addition to the conference data, the latest conference log can be given to all conferees, distributed through the shortest route searched by a communication test, so that the conference can be developed smoothly.

Because of sharing application that is activated during the conference, further effective conference can be performed, sharing the screen, to which chat or free-hand box inserted, using the shared application screen.

Further, the application sharing screen is uploaded to the Web server so as to be available to other users who do not take part in the conference, thereby allowing any user who gains access to the application sharing screen to easily take part in the conference, by clicking the browser screen.

Although the above embodiment is directed to the conference including a plurality of conferees by way of example, proper peer-to-peer network configuration would be available without being limited to the conference, as long as a plurality of conferees make communication via a network. The present invention covers proper variants that do not impair the objects and advantages of the present invention, and is not restricted by the numerical values noted in the above embodiments.

What is claimed is:

1. A collaboration method effected through a peer-to-peer network, upon automatically taking part in a conference by clicking once, the method comprising:

sending an electronic mail to a plurality of conferee peers, said electronic mail having a URL of a conference host peer described thereon;

searching, to begin with, for a conferee peer at a shortest time location through communication tests from said conference host peer to distribute data to said conference peer at the shortest time location;

informing, after distribution of data, remaining conferee peers that said data distributed conferee peer is a mirror of said conference host peer;

searching a conferee peer at a shortest time location through communication tests from said conference host peer and from said mirror of said conference host peer to distribute data, wherein said searching a conferee peer comprises:

measuring a communication time wherein each of said plurality of conferee peers having received said electronic mail requests said conference host peer to distribute data and carry out communication tests;

measuring the communication time through communication tests for said plurality of conferee peers by said conference host peer having received material distribution requests from the plurality of conferee peers, retrieving the conferee peer giving the shortest communication time, transmitting the retrieved data, using the same as an own mirror, and then, notifying the other conferee peers to whom the data has not as yet been distributed of said conferee peer serving as said mirror;

causing the conferee peers to whom the data has not as yet been distributed to advance a request for distribution of the data to said conference host peer and said conferee peer serving as said mirror, carrying out communication tests to measure the communication time, and requesting distribution of the data to said conferee host peer or said conferee peer serving as said mirror giving the shortest communication time;

informing the other conferee peers to whom the data has not yet been distributed of said conferee peer serving as the mirror, after transmitting the data to said requesting conferee peer to serve as his own mirror upon receipt of a data distribution request from a single conferee peer by said conference peer serving as the mirror;

notifying the other conferee peers to whom the data has not as yet been distributed of said conferee peer serving as the mirror after measuring a communication time through communication tests to a plurality of requesting conferee peers upon receipt of a data distribution request by said conferee peer serving as the mirror from a plurality of conferee peers, retrieving a conferee peer giving a shortest communication time and transmitting the data to deem the same as the own mirror; and repeating said informing and notifying until completion of data transmission to all the conferee peers; and repeating the above operations until completion of distribution.

2. The method according to claim 1, wherein in said sending an electronic mail, said URL includes an HTML file and said HTML file has a URL of said host peer for use in peer connection.

3. The method according to claim 2, wherein in said sending an electronic mail, said URL described on said electronic mail includes a URL of an Internet service provider that dynamically allocates IP addresses, and said URL described on said HTML file is a temporary URL, for use in peer connection, allocated from said Internet service provider to said conference host peer.

4. The method according to claim 1, wherein in said sending an electronic mail, a specified time to start a conference and said URL are described on said electronic mail so that said conferee peers are kept on standby and activated at said specified time so as to allow said conferee pears to automatically take part in the conference.

5. The method according to claim 1, wherein if there is a time lag with the mail sender side upon reception of an electronic mail, said conferee peer is activated at a specified time after correction of said time lag so as to allow said conferee peer to automatically take part in a conference.

6. The method according to claim 1, wherein if there is a time lag with the mail sender side upon reception of an electric mail, said conferee peer automatically corrects the system time of the mail receiver side into the system time of the mail sender side and activates at a specified time so as to allow said conferee peer to automatically take part in a conference.

7. The method according to claim 1, wherein in said searching a conferee peer, when a conferee peer to be a data requester receives a plurality of addresses of data distributors, said conferee peer searches a data distributor at a shortest time location through a communication test to each data distributor and requests data distribution of said data distributor at a shortest time location.

8. The method according to claim 1 or 7, wherein said searching a conferee peer includes allowing conference data as said data to be automatically distributed from said conference host peer to all conferee peers or to a conferee peer that made a request.

9. The method according to claim 7, wherein said searching a conferee peer includes allowing conference data to be automatically distributed before the conference starts through connection of said conference host peer and said conferee peers.

10. The method according to claim 1 or 7, wherein said searching a conferee peer includes allowing a conference log of the previous conference to be automatically distributed as said data from said conference host peer to all conferee peers or a conferee peer that made a request.

11. The method according to claim 10, wherein said searching a conferee peer includes allowing said conference log of the previous conference to be distributed from a certain peer to only conferee peers that took part halfway in the conference.

12. The method according to claim 1, further comprising: sharing any application currently running on a plurality of conferee peers inclusive of said conference host peer while a conference is being held, and free-hand drawing or entering notes onto images generated by said application.

13. The method according to claim 12, wherein said sharing includes uploading images containing free-hand drawing to a Web server so as to allow a browse by the browser.

14. The method according to claim 12, wherein said sharing includes arranging, on a Web screen to be browsed, URLs of conferee peers for automatically taking part in a conference only by clicking once.

15. A collaboration system effected through a peer-to-peer network, upon automatically taking part in a conference by clicking once, said system comprising:
   a mail sending unit which sends an electronic mail to a plurality of conferee peers, said electronic mail having a URL of a conference host peer described thereon;
   a data distribution unit which searches, to begin with, for a conferee peer at a shortest time location through communication tests from said conference host peer to distribution data to said conference peer at the shortest time location, informs, after distribution of data, remaining conferee peers that said data distributed conferee peer is a mirror of said conference host peer, searches a conferee peer at a shortest time location through communication tests from said conference host peer and from said mirror of said conference host peer to distribute data, wherein said searches a conferee peer comprises measuring a communication time wherein each of said plurality of conferee peers having received said electronic mail requests said conference host peer to distribute data and carry out communication tests, measuring the communication time through communication tests for said plurality of conferee peers by said conference host peer having received material distribution requests from the plurality of conferee peers, retrieving the conferee peer giving the shortest communication time, transmitting the retrieved data, using the same as an own mirror, and then, notifying the other conferee peers to whom the data has not as yet been distributed of said conferee peer serving as said mirror, causing the conferee peers to whom the data has not as yet been distributed to advance a request for distribution of the data to said conference host peer and said conferee peer serving as said mirror, carrying out communication tests to measure the communication time, and requesting distribution of the data to said conferee host peer or said conferee peer serving as said mirror giving the shortest communication time, informing the other conferee peers to whom the data has not yet been distributed of said conferee peer serving as the mirror, after transmitting the data to said requesting conferee peer to serve as his own mirror upon receipt of a data distribution request from a single conferee peer by said conference peer serving as the mirror, notifying the other conferee peers to whom the data has not as yet been distributed of said conferee peer serving as the mirror after measuring a communication time through communication tests to a plurality of requesting conferee peers upon receipt of a data distribution request by said conferee peer serving as the mirror from a plurality of conferee peers, retrieving a conferee peer giving a shortest communication time and transmitting the data to deem the same as the own mirror, and repeating said informing and notifying until completion of data transmission to all the conferee peers, and repeats the above operations until completion of distribution.

16. A computer-readable recording medium having thereon stored a program for collaboration effected through a peer-to-peer network, upon automatically taking part in a conference by clicking one, the program allowing a computer to execute:
   sending an electronic mail to a plurality of conferee peers, said electronic mail having a URL of a conference host peer described thereon; searching, to begin with, for a conferee peer at a shortest time location through communication tests from said conference host peer to distribute data to said conference peer at the shortest time location;
   informing, after distribution of data, remaining conferee peers that said data distributed conferee peer is a mirror of said conference host peer;
   searching a conferee peer at a shortest time location through communication tests from said conference host peer and from said mirror of said conference host peer to distribute data, wherein said searching a conferee peer comprises:
   measuring a communication time wherein each of said plurality of conferee peers having received said electronic mail requests said conference host peer to distribute data and carry out communication tests;
   measuring the communication time through communication tests for said plurality of conferee peers by said conference host peer having received material distribution requests from the plurality of conferee peers, retrieving the conferee peer giving the shortest communication time, transmitting the retrieved data, using the same as an own mirror, and then, notifying the other conferee peers to whom the data has not as yet been distributed of said conferee peer serving as said mirror;
   causing the conferee peers to whom the data has not as yet been distributed to advance a request for distribution of the data to said conference host peer and said conferee peer serving as said mirror, carrying out communication tests to measure the communication time, and requesting distribution of the data to said conferee host peer or said conferee peer serving as said mirror giving the shortest communication time;
   informing the other conferee peers to whom the data has not yet been distributed of said conferee peer serving as the mirror, after transmitting the data to said requesting conferee peer to serve as his own mirror upon receipt of a data distribution request from a single conferee peer by said conference peer serving as the mirror;
   notifying the other conferee peers to whom the data has not as yet been distributed of said conferee peer serving as the mirror after measuring a communication time through communication tests to a plurality of requesting conferee peers upon receipt of a data distribution request by said conferee peer serving as the mirror from a plurality of conferee peers, retrieving a conferee peer giving a shortest communication time and transmitting the data to deem the same as the own mirror; and
   repeating said informing and notifying until completion of data transmission to all the conferee peers; and
   repeating the above operations until completion of distribution.

* * * * *

UNITED STATES PATENT AND TRADEMARK OFFICE
CERTIFICATE OF CORRECTION

PATENT NO. : 7,167,898 B2  
APPLICATION NO. : 10/086695  
DATED : January 23, 2007  
INVENTOR(S) : Yuichi Sato et al.

Page 1 of 1

It is certified that error appears in the above-identified patent and that said Letters Patent is hereby corrected as shown below:

Column 18, Line 48, change "vet" to --yet--.

Signed and Sealed this

Twenty-ninth Day of May, 2007

JON W. DUDAS  
*Director of the United States Patent and Trademark Office*